US009438583B2

(12) United States Patent
Suzuki et al.

(10) Patent No.: US 9,438,583 B2
(45) Date of Patent: Sep. 6, 2016

(54) CERTIFICATE GENERATION METHOD, CERTIFICATE GENERATION APPARATUS, INFORMATION PROCESSING APPARATUS, AND COMMUNICATION DEVICE

(71) Applicant: FUJITSU LIMITED, Kawasaki-shi, Kanagawa (JP)

(72) Inventors: Masato Suzuki, Chofu (JP); Seigo Kotani, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 14/219,153

(22) Filed: Mar. 19, 2014

(65) Prior Publication Data

US 2014/0310822 A1    Oct. 16, 2014

(30) Foreign Application Priority Data

Apr. 11, 2013 (JP) ................................. 2013-082631

(51) Int. Cl.
*H04L 29/06* (2006.01)
*H04L 9/32* (2006.01)

(52) U.S. Cl.
CPC ......... *H04L 63/0823* (2013.01); *H04L 9/3268* (2013.01); *H04L 63/062* (2013.01); *H04L 63/0853* (2013.01); *H04L 63/126* (2013.01); *H04L 9/3247* (2013.01); *H04L 2209/127* (2013.01)

(58) Field of Classification Search
CPC .................................................. H04L 63/0823
USPC ........................................................ 726/29
See application file for complete search history.

(56) References Cited

U.S. PATENT DOCUMENTS

| 6,789,193 B1* | 9/2004 | Heiden ................... G06F 21/33 705/76 |
| 2002/0093915 A1 | 7/2002 | Larson |
| 2005/0102503 A1* | 5/2005 | Imai ..................... G06F 21/445 713/156 |

(Continued)

FOREIGN PATENT DOCUMENTS

| EP | 1355447 | 10/2003 |
| EP | 2120392 | 11/2009 |

(Continued)

OTHER PUBLICATIONS

Extended European Search Report mailed by European Patent Office and corresponding to European Patent Application No. 14158812.9 on Sep. 17, 2014.

*Primary Examiner* — Jason K Gee
(74) *Attorney, Agent, or Firm* — Fujitsu Patent Center

(57) ABSTRACT

A certificate generation method executed by a computer, includes receiving specific information and configuration information of a communication device collected by an information processing apparatus, the specific information and the configuration information being transmitted from the communication device provided with the information processing apparatus having tamper resistance; determining a communication address of the communication device based on the specific information if a combination of the received specific information and the received configuration information of the communication device is equivalent to information stored beforehand in a storage unit; generating an electronic certificate including a part of or all of the specific information and the configuration information, and the determined communication address; and transmitting the electronic certificate to the communication device.

9 Claims, 25 Drawing Sheets

(56) References Cited

U.S. PATENT DOCUMENTS

| | | |
|---|---|---|
| 2008/0270790 A1 | 10/2008 | Brickell et al. |
| 2010/0046753 A1* | 2/2010 | Inami ............ H04N 1/32133<br>380/243 |
| 2011/0016328 A1* | 1/2011 | Qu ................. G06F 21/6254<br>713/189 |
| 2011/0185171 A1* | 7/2011 | Karasawa ............ G06F 21/33<br>713/156 |

FOREIGN PATENT DOCUMENTS

| | | |
|---|---|---|
| JP | 2008-098990 | 4/2008 |
| JP | 2009-267638 | 11/2009 |
| WO | 03/001736 | 1/2003 |
| WO | 2008/072009 | 6/2008 |

* cited by examiner

FIG.13

| DEVICE ID | CPU ID | AUXILIARY STORAGE UNIT ID | ... | BIOS VERSION | OS VERSION | HASH VALUE OF OS CONFIGURATION FILE | ... | MAC ADDRESS | ... |
|---|---|---|---|---|---|---|---|---|---|
| ... | ... | ... | ... | ... | ... | ... | ... | ... | ... |
| ... | ... | ... | ... | ... | ... | ... | ... | ... | ... |
| .. | .. | .. | .. | .. | .. | .. | .. | .. | .. |

| MAC ADDRESS | IP ADDRESS | DOMAIN NAME | OWNER'S NAME (COMPANY NAME) | ADDRESS | TELEPHONE NUMBER |
|---|---|---|---|---|---|
| 00:aa:bb:ff:fe:cc:dd :e1 | 2001:0db8:aaaa:0000: 0001:0000:0000:0001 | ffff.co.jp | FFFF LIMITED | ……… | +81-3-xxxx-2220 |
| 00:aa:bb:ff:fe:cc:dd :e2 | 2001:0db8:aaaa:0000: 0001:0000:0000:0002 | ffff.co.jp | FFFF LIMITED | ……… | +81-3-xxxx-2220 |
| 00:aa:bb:ff:fe:cc:dd :e3 | 2001:0db8:aaaa:0000: 0001:0000:0000:0003 | ffff.co.jp | FFFF LIMITED | ……… | +81-3-xxxx-2220 |
| … | … | … | … | … | … |
| 00:aa:bb:ff:fe:cc:dd :ee | 2001:0db8:aaaa:0000: 0001:0000:0000:000e | ffff.co.jp | FFFF LIMITED | ……… | +81-3-xxxx-2220 |

FIG.15

| FIELD NAME | CONTENT (EXAMPLE) | | |
|---|---|---|---|
| version | Version 3 | | |
| serialNumber | 123456789 | | |
| signature | PKCS #1 SHA-256 With RSA Encryption | | |
| issuer | CN = FFF Certification Authority O = FFF Network C = jp | | |
| validity | Not Before: 2011/01/01 9:00:00 (2011/01/01 0:00:00 GMT)<br>Not After: 2016/01/01 9:00:00 (2016/01/01 0:00:00 GMT) | | |
| subject | CN = FFF Certification Authority O = FFF Network C = jp | | |
| subjectPublicKeyInfo | <PUBLIC KEY> | | |
| issuerUniqueIdentifier | ... | | |
| | extensions | | |
| | extnId | extnValue | critical |
| | IPv6 Global Unicast Address | 2001:0db8:aaaa:0000:0001:0000:0000:0001 | Critical |
| | Global Routing Prefix Mask | /48 | Critical |
| | Sub-Net ID Mask | /16 | Critical |
| | Private ID Mask | /16 | Critical |
| | Mac Address | 00 11 aa bb cc dd ee ff | Not Critical |
| : | : | | |

| SUBNET ADDRESS | SESSION ID | SOURCE IP | DESTINATION IP |
|---|---|---|---|
| 2001:0db8:aaaa:0000:0001 | 0010:0000:0000-024583 | 2001:0db8:aaaa:<br>0000:0001:0000:0000:0001 | 2001:0db8:aaaa:<br>0000:0001:0010:0000:0000 |
| 2001:0db8:aaaa:0000:0001 | — | 2001:0db8:aaaa:<br>0000:0001:0000:0000:0001 | — |
| 2001:0db8:aaaa:0000:0003 | 0020:0000:0000-722329 | 2001:0db8:aaaa:<br>0000:0001:0000:0000:0001 | 2001:0db8:aaaa:<br>0000:0003:0020:0000:0000 |
| ∶ | ∶ | ∶ | ∶ |

| STATE | SYMMETRIC KEY<br>FOR ENCRYPTION | CHALLENGE WORD | AUTHENTICATION<br>REQUEST TIME | LAST<br>RESPONSE TIME |
|---|---|---|---|---|
| IN CONNECTION | ⋯ | Dsadjksdqafsrf435⋯ | ⋯ | — |
| INITIALIZING | — | — | ⋯ | — |
| DISCONNECTED | ⋯ | 9cdszalkr4w9cfsdk⋯ | ⋯ | ⋯ |
| ∶ | ∶ | ∶ | ∶ | ∶ |

FIG.25

| GLOBAL ROUTING PREFIX | GLOBAL ROUTING PREFIX MASK | SOURCE WHITE NET ID | SUBNET MASK | PERMISSION LIST | DENIAL LIST |
|---|---|---|---|---|---|
| 2001:0db8:aaa1 | /48 | 0000:0001 | /80 | 0000:0002 | — |
| | | | | 0000:0003 | — |
| | | | | :: | Others |
| | | 0000:0010 | /80 | — | 0100:000 — FFFF:FFFF |
| | | | | Others | — |

| GLOBAL ROUTING PREFIX | GLOBAL ROUTING PREFIX ADDRESS MASK | SUBNET MASK | WHITE NET ID | PORT NUMBER (LOGICAL PORT) |
|---|---|---|---|---|
| 2001:0db8:aaa1 | /48 | /80 | 0000:0001 | 0000:0000:0000:0000:0001 |
| | | | 0000:0002 | 0000:0000:0000:0000:0002 |
| | | | 0000:000a | 0000:0000:0000:0000:0003 |
| ... | ... | ... | ... | ... |
| 2001:0db8:aaa2 | /48 | /72 | 0000:01 | 0000:0000:0000:0000:00a1 |
| | | | 0000:10 | 0000:0000:0000:0000:00a2 |
| | | | 0000:20 | 0000:0000:0000:0000:00a3 |
| ... | ... | ... | ... | ... |
| 2001:0db8:aaaa:0003 | /64 | /80 | 0000: | 0000:0000:0000:3028:29fc |
| ... | ... | ... | ... | ... |

18

CERTIFICATE GENERATION METHOD, CERTIFICATE GENERATION APPARATUS, INFORMATION PROCESSING APPARATUS, AND COMMUNICATION DEVICE

CROSS-REFERENCE TO RELATED APPLICATIONS

This application is based upon and claims the benefit of priority of the prior Japanese Priority Application No. 2013-082631 filed on Apr. 11, 2013, the entire contents of which are hereby incorporated by reference.

FIELD

The disclosures herein generally relate to a certificate generation method, a certificate generation apparatus, an information processing apparatus, a communication device, and a program.

BACKGROUND

When using IPv4, a globally unique IP address cannot be assigned to every communication device that is connected with the Internet due to a restriction on the bit length used for an IP address. Therefore, conversion between a global IP address and a private IP address has been practiced by using for example, NAT (Network Address Translator). Use of NAT enhances anonymity of an IP addresses, which is considered as one of the causes that encourage fraudulent acts on the Internet.

On the other hand, by using a global unicast address of IPv6 that enables path aggregation, the anonymity found in IPv4 is reduced. Consequently, it is expected that a fraudulent actor can be identified easier than as done conventionally.

RELATED-ART DOCUMENTS

Patent Documents

[Patent Document 1] Japanese Laid-open Patent Publication No. 2009-267638
[Patent Document 2] Japanese Laid-open Patent Publication No. 2008-098990

However, communication using IPv6 does not necessarily guarantee that safe communication is secured. Even if communicating with IPv6, it is difficult to completely prevent fraudulent acts from happening, such as spoofing and eavesdropping.

Thereupon, the inventors of the present invention work on building up a virtual or logical network domain where it is difficult for an invalid device to make a connection with the domain. For example, a network domain is under investigation in which permission for a connection is given to a device that has received an issuance of an electronic certificate.

Note that such an electronic certificate needs to be issued to a device whose validity has been confirmed. For example, if a device can easily falsify its own identification, the likelihood is high of an electronic certificate being issued to an invalid device. If that is the case, it is difficult to secure safety of the above network domain.

SUMMARY

According to at least one embodiment of the present invention, a certificate generation method executed by a computer, includes receiving specific information and configuration information of a communication device collected by an information processing apparatus, the specific information and the configuration information being transmitted from the communication device provided with the information processing apparatus having tamper resistance; determining a communication address of the communication device based on the specific information if a combination of the received specific information and the received configuration information of the communication device is equivalent to information stored beforehand in a storage unit; generating an electronic certificate including a part of or all of the specific information and the configuration information, and the determined communication address; and transmitting the electronic certificate to the communication device.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 13 is a schematic view illustrating an example of a configuration of a white list storage unit;

FIG. 14 is a schematic view illustrating an example of a configuration of a device information storage unit;

FIG. 15 is a schematic view illustrating an example of a configuration of a device certificate;

FIG. 22 is a schematic view illustrating an example of a configuration of a session information storage unit;

FIG. 25 is a schematic view illustrating an example of a configuration of a routing policy storage unit; and FIG. 26 is a schematic view illustrating an example of a configuration of a routing information storage unit.

DESCRIPTION OF EMBODIMENTS

Figure 1:
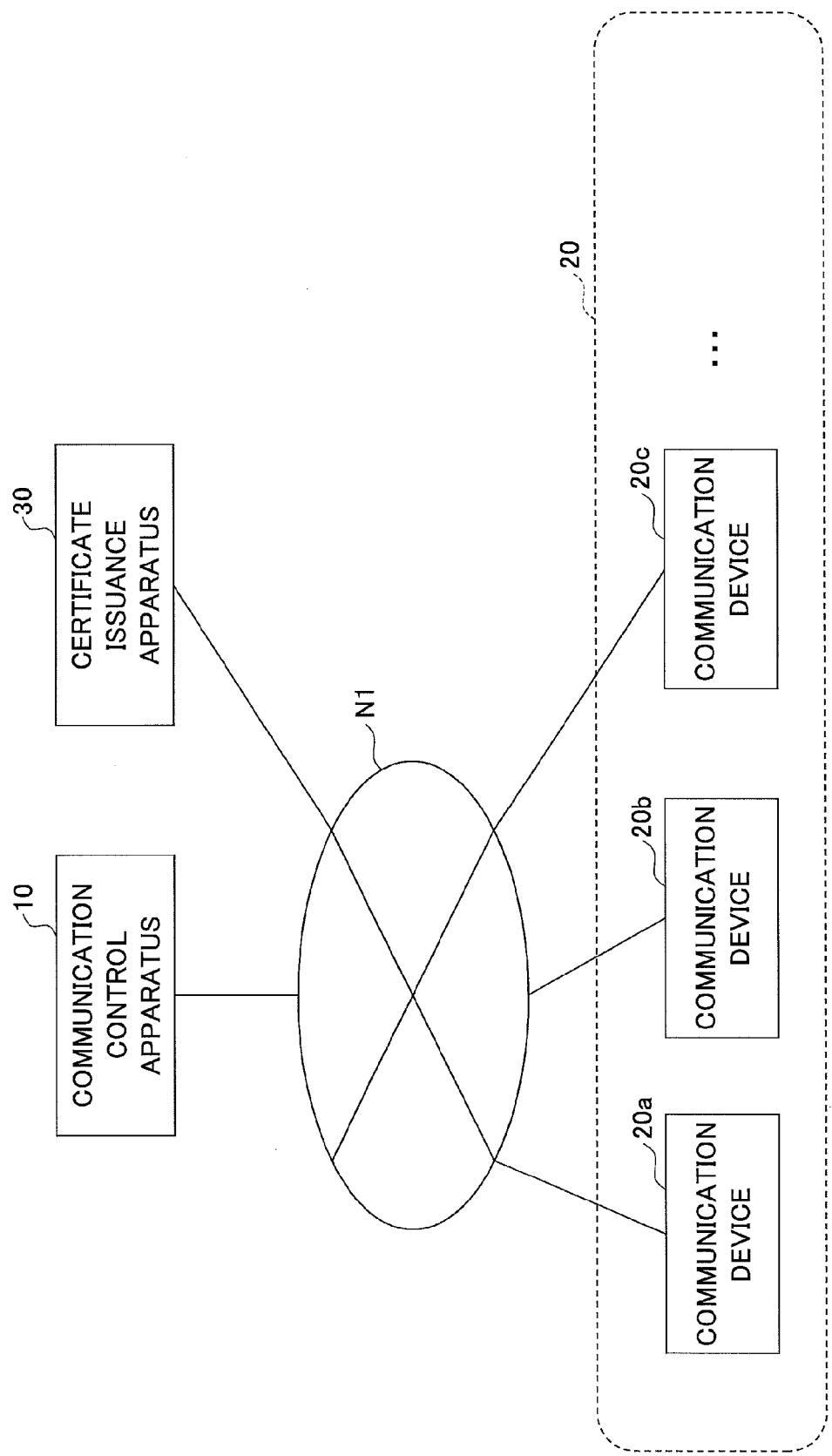
FIG. 1 is a schematic view illustrating an example of a configuration of a network system according to an embodiment of the present invention.

In the following, embodiments of the present invention will be described with reference to the drawings. FIG. 1 is a schematic view illustrating an example of a configuration of a network system according to an embodiment of the present invention. In FIG. 1, multiple communication devices 20 such as communication devices 20a, 20b, and 20c, a communication control apparatus 10, and a certificate issuance apparatus 30 can communicate with each other via a network N1. The network N1 is an access network or an access communication channel to, for example, the Internet. A concrete example of the network N1 may be an NGN (Next Generation Network) or a mobile communication network.

The communication control apparatus 10 is installed, for example, between each of the communication devices 20 and the Internet. Alternatively, the Internet may intervene between the communication control apparatus 10 and each of the communication devices 20. Also, the Internet may intervene between the certificate issuance apparatus and each of the communication devices 20. An administrator or an operator of the communication control apparatus 10 may be, for example, an ISP (Internet Service Provider) or a VNE (Virtual Network Enabler). An administrator or an operator of the certificate issuance apparatus 30 may be, for example, an ISP or a CA (Certificate Authority). In the present embodiment, the communication control apparatus 10 and the certificate issuance apparatus are managed and operated by the same ISP for the sake of explanation.

The communication device 20 is one of various communication devices that can communicate using IPv6. Namely, IPv6 is basically used as a communication protocol in the present embodiment. The communication devices 20 may include various electronic devices having a communication function, such as a PC (Personal Computer), a smart phone, a cellular phone, a tablet-type terminal, a PDA (Personal Digital Assistant), and digital home appliances.

The communication control apparatus 10 is a computer or a network apparatus that executes a process for providing a safe network domain for an ISP customer, namely, a subscriber. A safe network domain is a virtual or logical subnet or network segment with which only a communication device 20 whose identification has been guaranteed can make a connection. In the following, a safe network domain will be referred to as a "white net" for convenience' sake. The white net will be described in detail later. Note that multiple computers may constitute the communication control apparatus 10. Namely, functions executed by the communication control apparatus 10 may be distributed to the multiple computers to be implemented.

The certificate issuance apparatus 30 is a computer for generating and issuing a public key certificate that is necessary for a communication device 20 to connect with a white net. Namely, a communication device 20 needs to have a public key certificate that proves the identification of the communication device 20 when making a connection with a white net. In the following, a public key certificate issued for each of the communication devices 20 is called a "device certificate".

Figure 2:
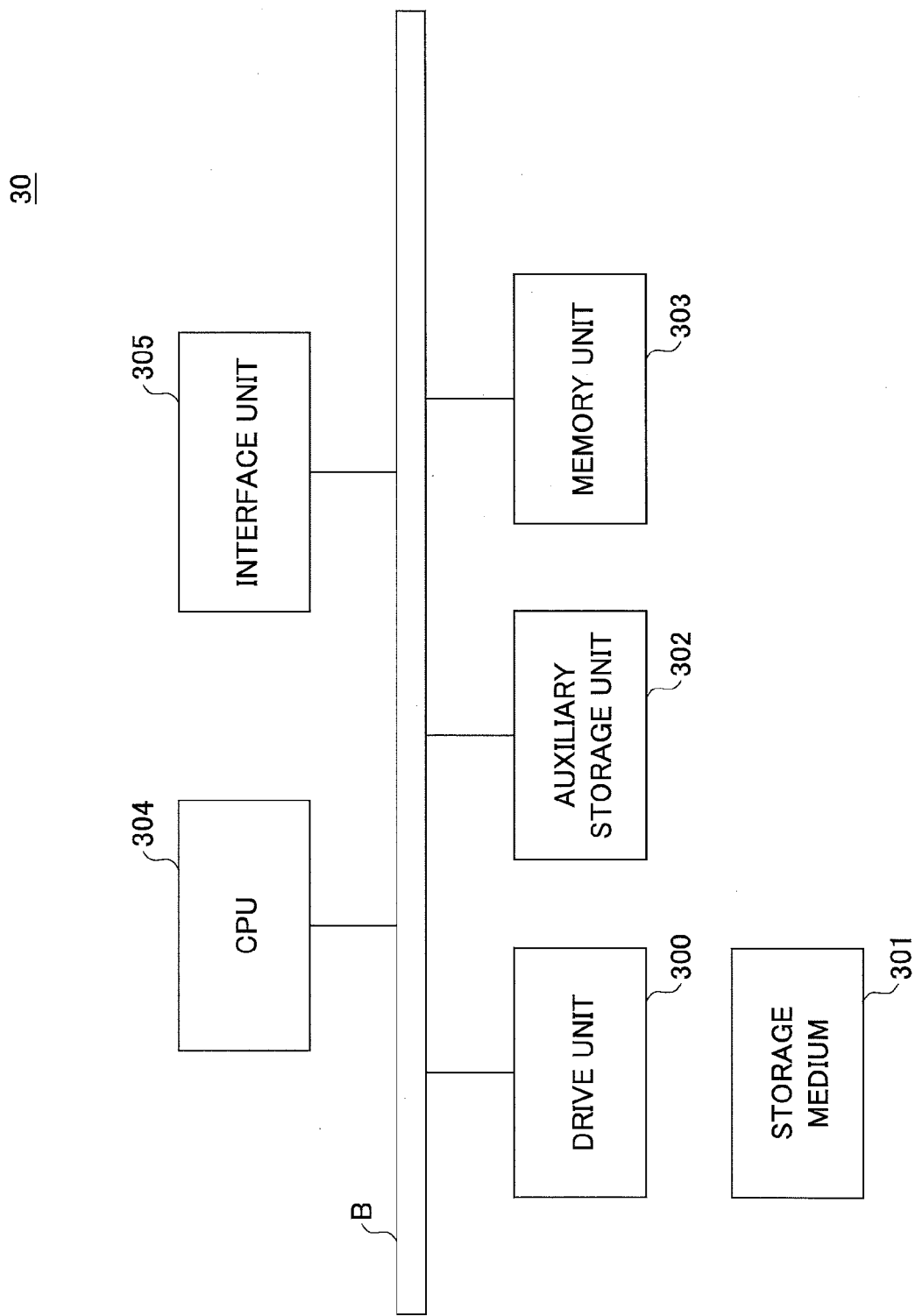
FIG. 2 is a schematic view illustrating an example of a hardware configuration of a certificate issuance apparatus according to an embodiment of the present invention.

FIG. 2 is a schematic view illustrating an example of a hardware configuration of the certificate issuance apparatus 30 according to the present embodiment of the present invention. The certificate issuance apparatus 30 in FIG. 2 includes a drive unit 300, an auxiliary storage unit 302, a memory unit 303, a CPU 304, and an interface unit 305, which are mutually connected via a bus B.

A program that performs processing on the certificate issuance apparatus 30 is provided with a storage medium 301. When the storage medium 301 storing the program is set in the drive unit 300, the program is installed into the auxiliary storage unit 302 from the storage medium 301 via the drive unit 300. However, installation of the program is not necessarily executed from the storage medium 301, but may be downloaded from another computer via the network. The auxiliary storage unit 302 stores the installed program, and stores required files, data, and the like as well.

The memory unit 303 reads the program from the auxiliary storage unit 302 to store the program into it when receiving a start command for the program. The CPU 304 implements functions relating to the certificate issuance apparatus 30 by executing the program stored in the memory unit 303. The interface unit 305 is used as an interface for connecting with the network.

Note that an example of the storage medium 301 may be a CD-ROM, a DVD disk, or a portable recording medium such as a USB memory, etc. Also, an example of the auxiliary storage unit 302 may be an HDD (Hard Disk Drive), a flash memory, or the like. Both the storage medium 301 and the auxiliary storage unit 302 correspond to computer-readable recording media.

Note that communication control apparatus 10 may have substantially the same hardware configuration as illustrated in FIG. 2.

Figure 3:
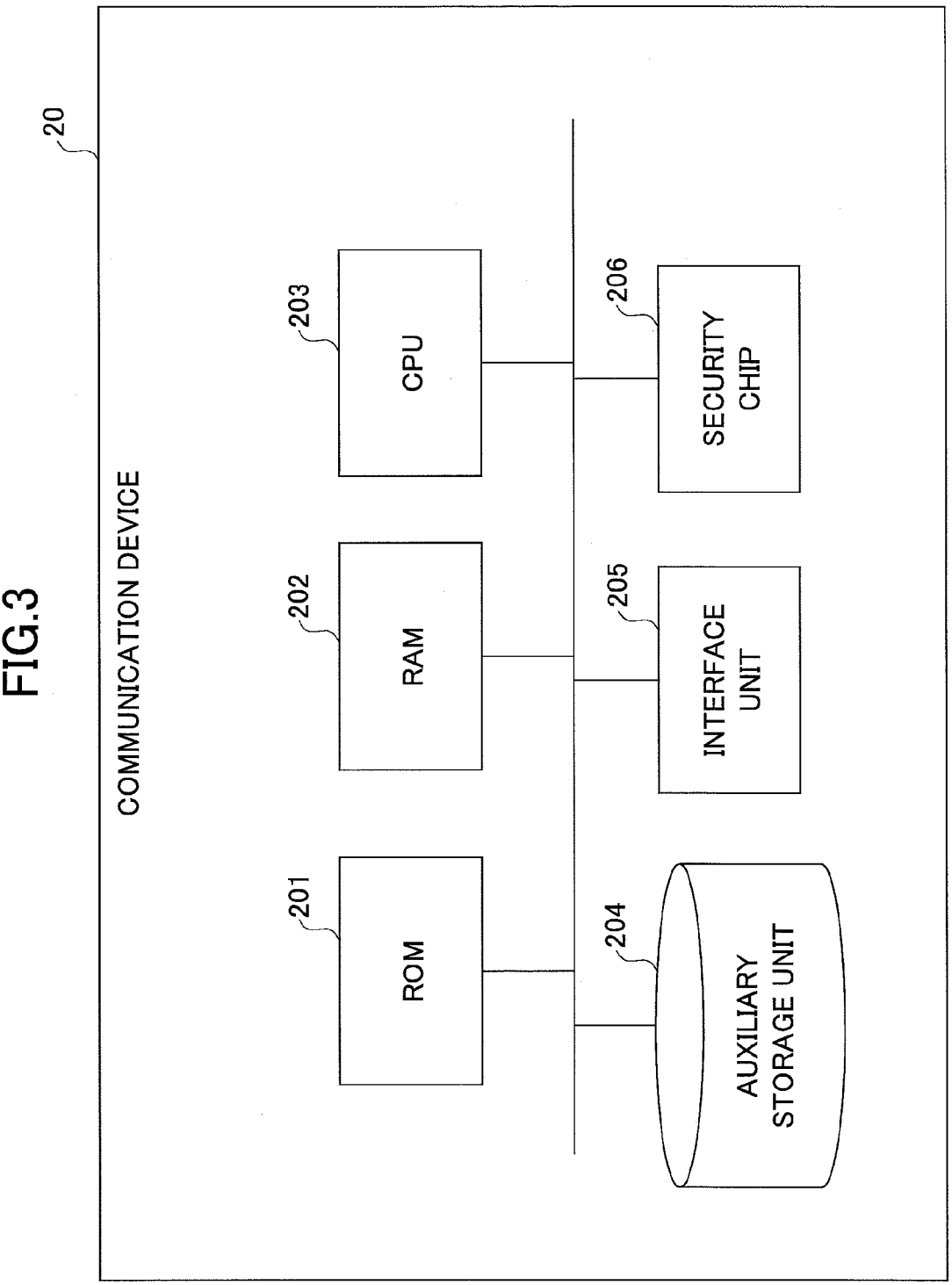
FIG. 3 is a schematic view illustrating an example of a hardware configuration of a communication device according to an embodiment of the present invention.

FIG. 3 is a schematic view illustrating an example of a hardware configuration of the communication device 20 according to the present embodiment of the present invention. In FIG. 3, the communication device 20 includes a ROM 201, a RAM 202, a CPU 203, an auxiliary storage unit 204, an interface unit 205, and a security chip 206. The ROM 201 stores programs, data, and the like. The RAM 202 reads and stores a program that is activated among stored programs in the ROM 201 or the auxiliary storage unit 204. The CPU 203 implements functions relating to the communication device 20 by executing the program stored in the RAM 202. The auxiliary storage unit 204 stores programs, data, and the like. The interface unit 205 is hardware for connecting with the network such as a network card. The security chip 206 is an LSI (Large Scale Integration) chip that has tamper resistance. An example of the security chip 206 is a TPM (Trusted Platform Module).

Note that, the communication device 20 may include a display unit such as an LCD display, and an input unit such as a keyboard, a mouse, a button, a touch panel, or the like.

Figure 4:
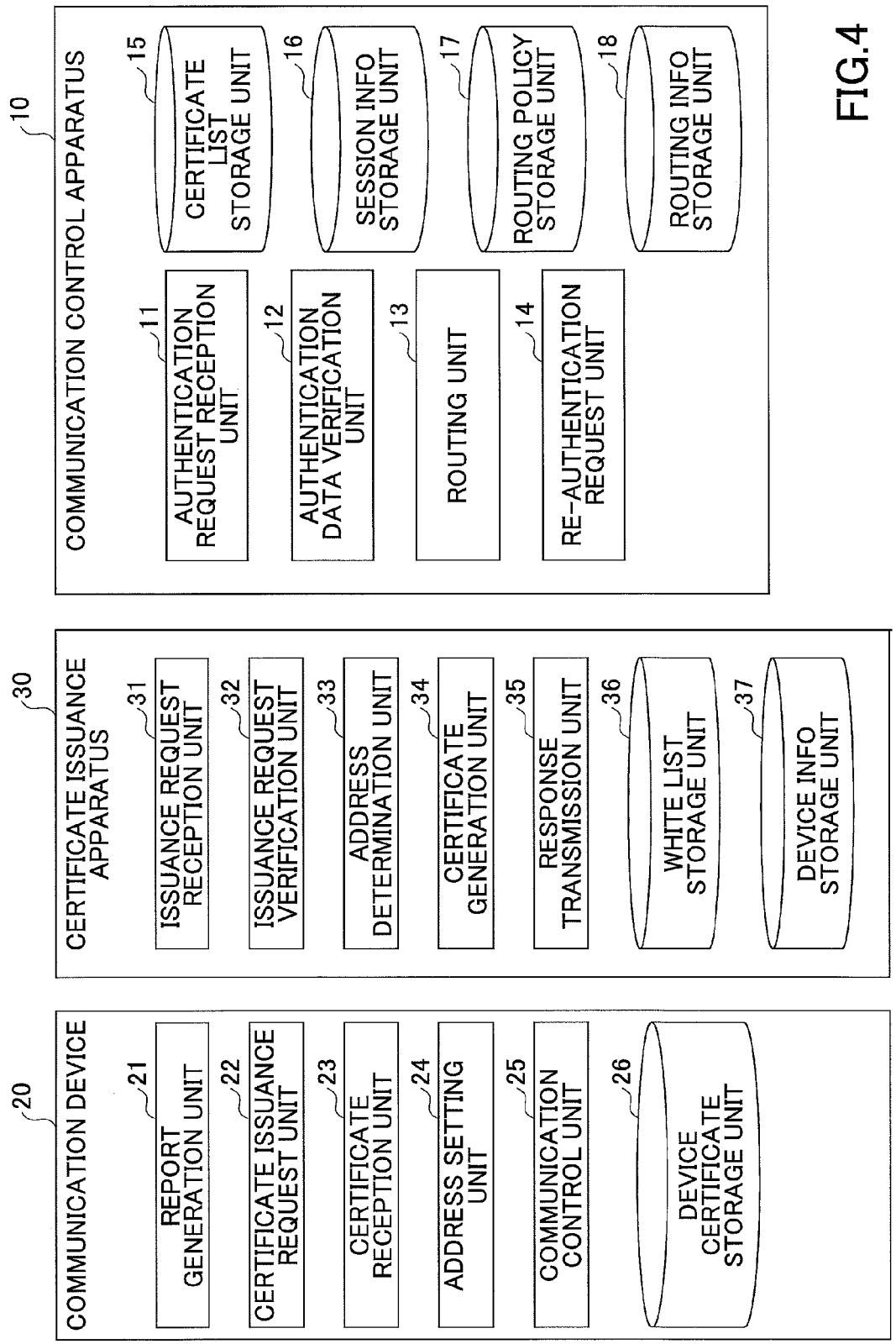
FIG. 4 is a schematic view illustrating an example of functional configurations of devices according to an embodiment of the present invention.

FIG. 4 is a schematic view illustrating an example of functional configurations of the devices, respectively, according to the present embodiment of the present invention. In FIG. 4, the certificate issuance apparatus 30 includes an issuance request reception unit 31, an issuance request verification unit 32, an address determination unit 33, a certificate generation unit 34, and a response transmission unit 35. These units are implemented by processes that a program installed in the certificate issuance apparatus 30 has the CPU 304 execute. The certificate issuance apparatus 30 also utilizes a white list storage unit 36 and a device information storage unit 37. These units may be implemented by the auxiliary storage unit 302 or a storage device connected with the certificate issuance apparatus 30 via the network.

The issuance request reception unit 31 receives an issuance request of a device certificate that is transmitted from the communication device 20. The issuance request verification unit 32 verifies validity of the received issuance request. The address determination unit 33 determines an IP address for the communication device 20, which is the source of the issuance request for the device certificate. The certificate generation unit 34 generates the device certificate that includes the determined IP address. The response transmission unit 35 returns a response to the issuance request for the device certificate. For example, the response transmission unit 35 transmits the device certificate that is generated by the certificate generation unit 34 to the communication device 20 that is the source of the issuance request.

The white list storage unit 36 stores information for verifying validity of an issuance request. The device information storage unit 37 stores an IP address assigned to a communication device 20 by associating the IP address with specific information of the communication device 20. In the present embodiment, the MAC address of a communication device 20 is taken as an example of the specific information.

The communication device 20 includes a report generation unit 21, a certificate issuance request unit 22, a certificate reception unit 23, an address setting unit 24, and a communication control unit 25. The report generation unit 21, the certificate issuance request unit 22, the certificate reception unit 23, and the address setting unit 24 are implemented by processes that a program stored in a memory of the security chip 206 has a CPU in the security chip 206 execute. The communication control unit 25 is implemented by processes that a program installed in the auxiliary storage unit 204 has the CPU 203 execute. The communication device 20 also includes a device certificate storage unit 26. The device certificate storage unit 26 may be implemented, for example, by using the memory of the security chip 206 or the auxiliary storage unit 204. If the device certificate storage unit 26 is formed outside of the security chip 206, security of the device certificate storage unit 26 may be improved, for example, by using the Protected Storage function of TPM.

The report generation unit 21 generates report information that includes configuration information of the communication device 20. The configuration information of the communication device is information that indicates an operation environment of the communication device 20, which includes configuration information of hardware connected or provided with the communication device 20, and configuration information of software installed in the communication device 20. The certificate issuance request unit 22 transmits an issuance request of a device certificate to the certificate issuance apparatus 30. In the issuance request, the report information generated by the report generation unit 21 is specified. In accordance with the issuance request for the device certificate, the certificate reception unit 23 receives the device certificate that has been generated and replied by the certificate issuance apparatus 30. The address setting unit 24 sets the IP address included in the device certificate to the communication control unit 25 of the communication device 20. Specifically, the IP address is stored into a region that is reserved as a storage region of the IP address by the communication control unit 25 in the auxiliary storage unit 204 of the communication device 20. The communication control unit 25 executes a process for controlling communications with the communication control apparatus 10 and the other communication devices 20. The communication control unit 25 executes a process for proving its own validity by using the device certificate and a private key stored in the device certificate storage unit 26 when making a connection with a white net.

The device certificate storage unit 26 stores the device certificate issued for the communication device 20. The device certificate storage unit 26 also stores the private key that corresponds to a public key included in the device certificate.

The communication control apparatus 10 includes an authentication request reception unit 11, an authentication data verification unit 12, a routing unit 13, and a re-authentication request unit 14. These units are implemented by processes that a program installed in the communication control apparatus 10 has a CPU of the communication control apparatus 10 execute.

The communication control apparatus 10 also utilizes a certificate list storage unit 15, a session information storage unit 16, a routing policy storage unit 17, and a routing information storage unit 18. These units may be implemented by an auxiliary storage unit of the communication control apparatus 10 or a storage device connected with the communication control apparatus 10 via the network.

The authentication request reception unit receives an authentication request for connecting with a white net from the communication device 20. The authentication data verification unit 12 receives authentication data that indicates validity of the communication device 20, from the communication device 20 relating to the authentication request, and verifies the authentication data by using the device certificate stored in the certificate list storage unit 15. The certificate list storage unit 15 stores device certificates issued to the communication devices 20, respectively. The device certificate may be received by the certificate issuance apparatus 30 when the certificate issuance apparatus 30 issues the device certificate to the communication device 20, and stored into the certificate list storage unit 15.

The routing unit 13 executes routing of packets from the communication device 20 whose authentication data has been verified, namely, validity has been confirmed. Routing is restricted by a routing policy stored in the routing policy storage unit 17. The routing policy is information that indicates whether to execute routing, which depends on a combination of transmission source and destination. The routing unit 13 also utilizes the routing information storage unit 18. The routing information storage unit 18 stores information for distinguishing a port to be used at a destination.

The re-authentication request unit 14 transmits a re-authentication request that indicates a request for re-authentication to the communication device 20 at a predetermined timing. In response to receiving the re-authentication request, the communication device 20 transmits an authentication request for connecting with a white net to the communication control apparatus 10 again.

Next, the white net will be described in detail. As an example of usage of the white net, usage forms illustrated in FIG. 5 and FIG. 6 may be considered.

Figure 5:
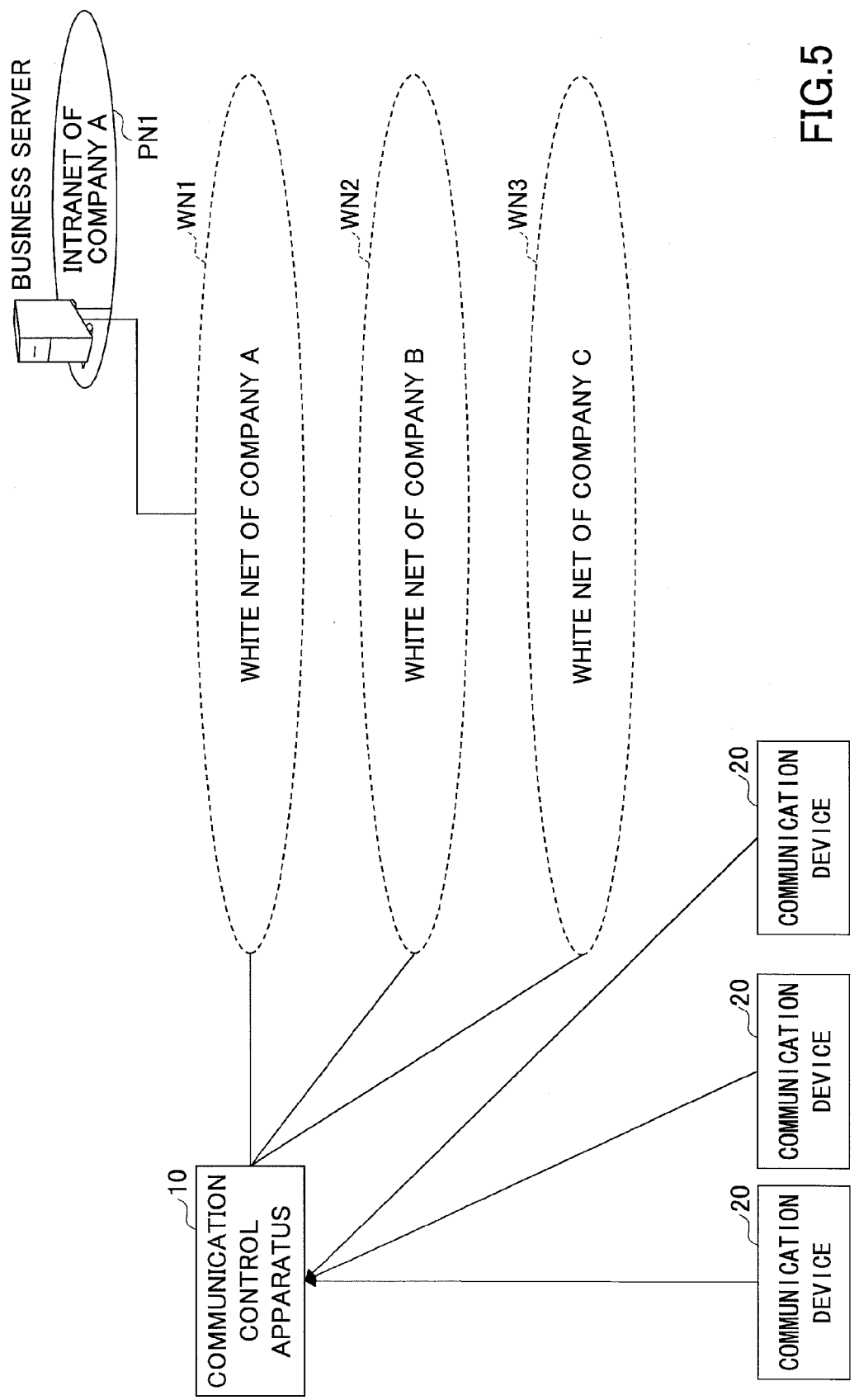
FIG. 5 is a schematic view illustrating an example of a first usage form of a white net.

FIG. 5 is a schematic view illustrating an example of a first usage form of white nets. FIG. 5 illustrates the usage form in which a white net is used as a virtual intranet for each company.

In FIG. 5, the white nets WN1, WN2, and WN3 are virtual intranets for a company A, a company B, and a company C, respectively. For example, an employee of the company A can use a communication device 20 at home or on the way to connect with the white net WN1. Also, communication devices 20 that are connected with an existing physical intranet PN1 of the company A may connect with the white net WN1. However, for a communication device 20 used by a person other than employees of the company A, connection with the white net WN1 is denied. Therefore, the white net WN1 is a safe network with which only the employees of the company A can connect. Note that departments in a company may have their own white nets, respectively.

Figure 6:
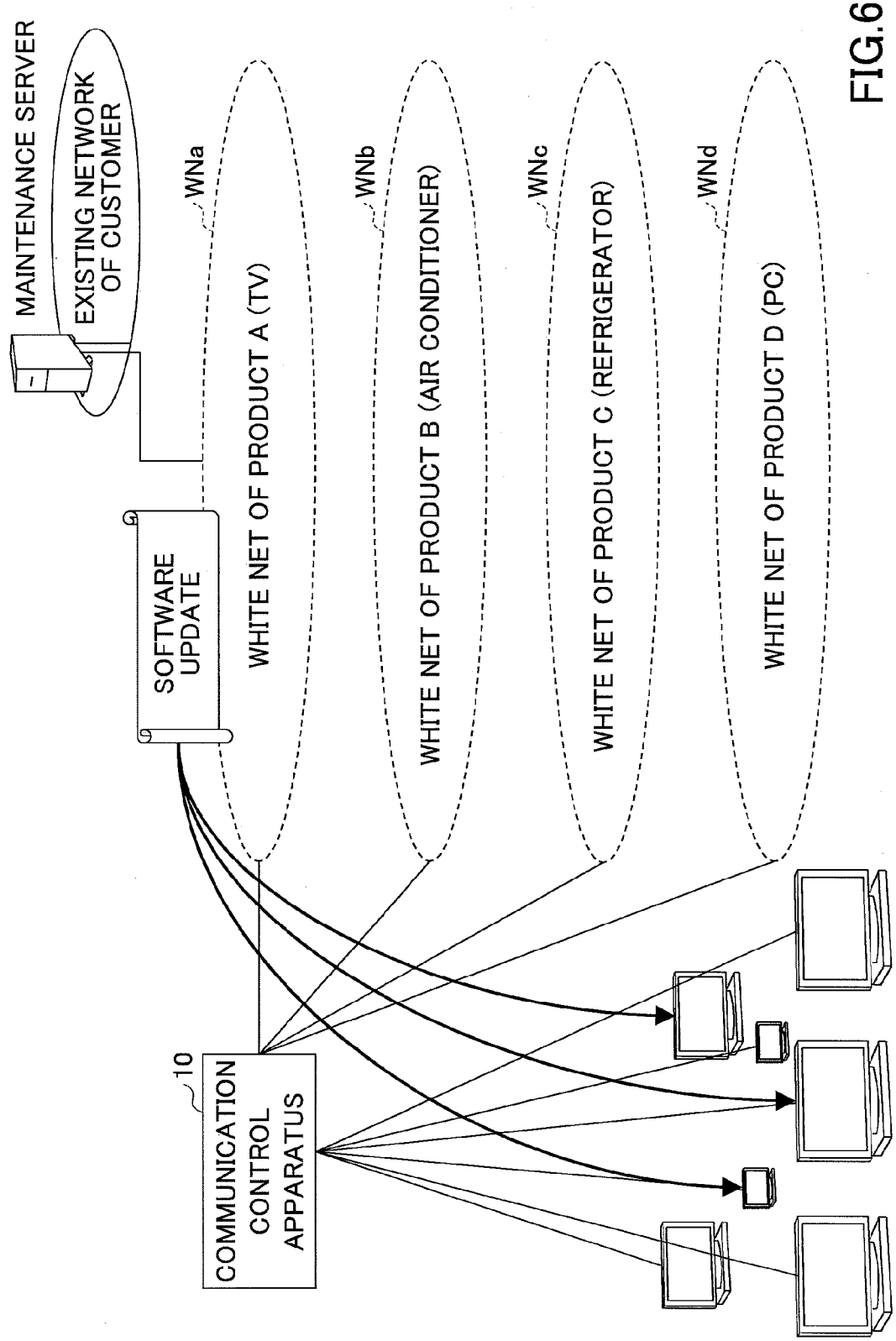
FIG. 6 is a schematic view illustrating an example of a second usage form of a white net.

FIG. 6 is a schematic view illustrating an example of a second usage form of white nets. FIG. 6 illustrates the usage form in which a white net is allocated for each product model number in a manufacturer. For example, the white net WNa is a white net with which only a product A (TV) is permitted to connect. The white net WNb, WNc, or WNd is a white net with which only a product B, a product C, or a product D is permitted to connect, respectively.

For example, a product A that may be sold on the market and used at home or at work makes a connection with the white net WNa when it is activated. In this case, it is possible for the manufacturer to easily offer a maintenance service when necessary, such as update of software for the product A. This is because the manufacturer can restrict offering of the maintenance service, such as software update, to the communication devices 20 connected with the white net WNa.

Note that usage of the white net is not limited to those uses illustrated in FIG. 5 and FIG. 6.

Figure 7:
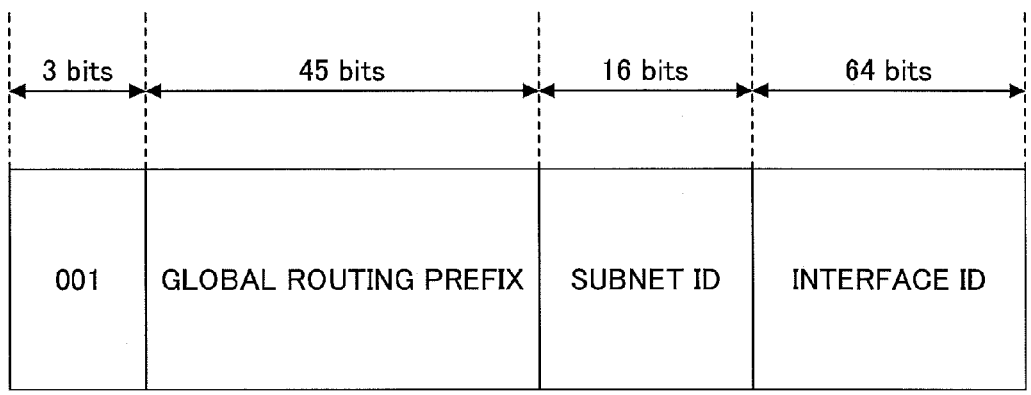
FIG. 7 is a schematic view illustrating architecture of an IPv6 global unicast address that is currently adopted.

Incidentally, the format of an IPv6 global unicast address that is currently adopted in general is as illustrated in FIG. 7. "Currently adopted in general" also means that the format is adopted in existing IPv6 networks that have already been built.

FIG. 7 is a schematic view illustrating the architecture of an IPv6 global unicast address that is currently adopted. FIG. 7 illustrates the architecture of a global unicast address that is described in RFC 3587. A global unicast address will be simply called an "IP address" in the following. Note that 16 bits starting from the 49-th bit from the head are used as an identification field for a subnet. Namely, the identification field stores a subnet ID, which is an identifier of a subnet. Therefore, in an IPv6 global unicast address currently adopted, a subnet is identified by the leading 64 bits.

On the other hand, 64 bits in the latter half are used as an identification field for a network interface to which a MAC address is assigned. Namely, the identification field stores an interface ID, which is an identifier of a network interface.

For example, an ISP allocates the leading 48 bits to a subscriber organization such as a user company. In this case, the subscriber organization can freely use the lower 80 bits at a maximum.

As described above, a white net is a subnet. Therefore, if a white net is allocated according to the address architecture illustrated in FIG. 7, a subscriber organization may have 65,536 white nets at a maximum using the 16-bit field for the subnet ID. Although the number 65,536 may seem to be sufficient, for example, for the usage form illustrated in FIG. 5, there is a risk of exhaustion when considering the usage form illustrated in FIG. 6. Namely, in the usage form illustrated in FIG. 6, a white net is allocated for each product model number. A new model number is assigned every time when a model change occurs. Considering that maintenance services for old models need to be continued, it is difficult to invalidate existing model numbers. Therefore, one can easily imagine that a manufacturer needs model numbers for more than 65,536 models. Namely, one can easily imagine that it is not sufficient for a subscriber organization to have 16 bits for the subnets.

Figure 8:
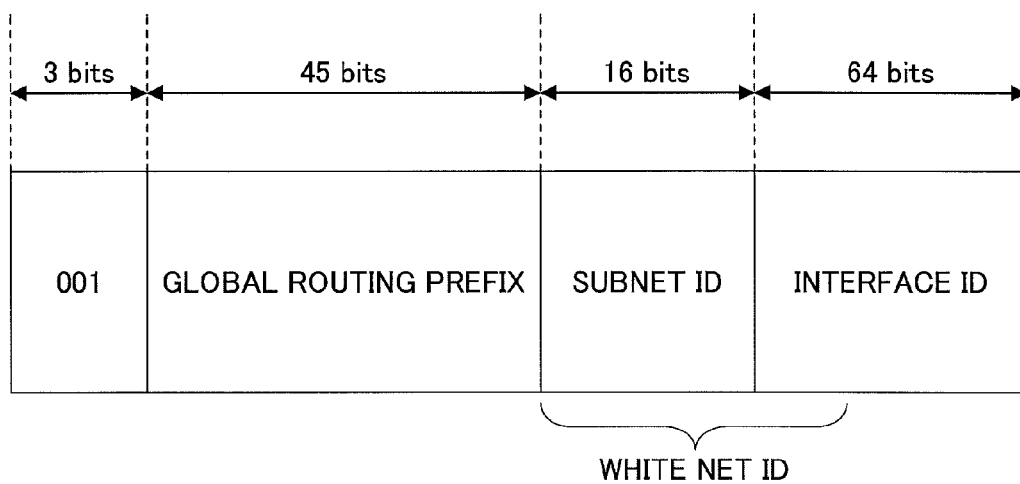
FIG. 8 is a schematic view illustrating a white net ID.

Thereupon, a part of the interface ID field is used for identifying a white net as illustrated in FIG. 8 according to the present embodiment. In other words, in addition to the subnet ID field, a part of the interface ID field is used for storing an identifier of a white net. In the following, the identifier of a white net is called a "white net ID".

FIG. 8 is a schematic view illustrating a white net ID. As illustrated in FIG. 8, in addition to the subnet ID field, an upper part of the interface ID field is used for the white net ID field according to the present embodiment. In other words, the identification field for a subnet is extended to the upper part of the interface ID field. Note that the identification field for an interface is reduced with extension of the part for the subnet.

A degree of extension of the identification field for a subnet may be determined, for example, when allocating IP addresses to a subscriber organization. Note that the bit length from the leading bit of the IP address to the tail bit of the white net ID is called a "subnet mask" in the following.

Figure 9:
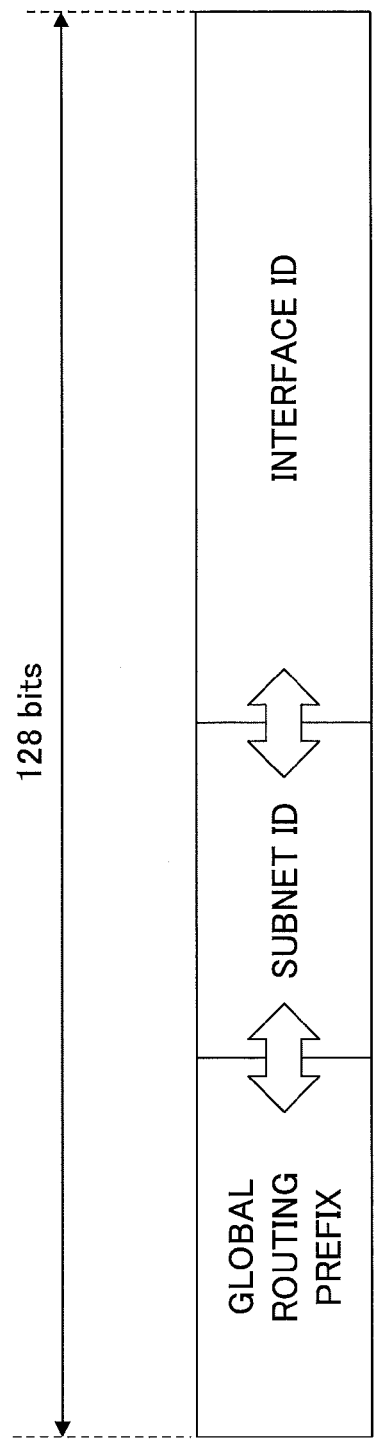
FIG. 9 is a schematic view illustrating general architecture of an IPv6 global unicast address.

In contrast to the above, the general architecture of an IPv6 global unicast address is specified in RFC 3513 as illustrated in FIG. 9.

FIG. 9 is a schematic view illustrating the general architecture of an IPv6 global unicast address. As illustrated in FIG. 9, the lengths of fields for the global routing prefix, the subnet ID, and the interface ID are variable as long as the total length of these are contained within 128 bits according to RFC 3513. Namely, bidirectional arrows between the fields indicate that boundaries between the fields can be moved.

Therefore, according to RFC 3513, the subnet ID field may have an arbitrary length greater than or equal to 16. Consequently, subnet IDs can be defined to achieve the object of the white net ID described above.

However, for an IP address having variable fields as described in RFC 3513, operational details are not clarified at this time. Also, the address architecture described in FIG. 7 has been adopted in existing IPv6 networks.

Figure 10:
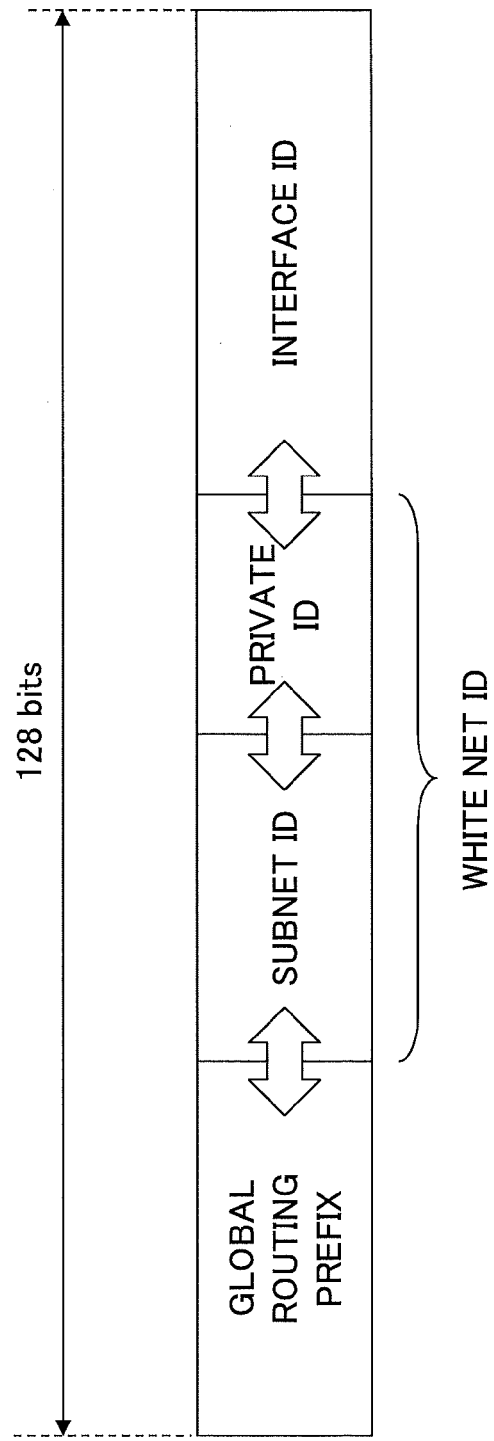
FIG. 10 is a schematic view illustrating architecture of an IP address according to an embodiment of the present invention.

Thereupon, according to the present embodiment, address architecture illustrated in FIG. 10 is adopted so that compatibility is satisfied both with the address architecture of existing IPv6 networks, and with RFC 3513.

FIG. 10 is a schematic view illustrating the architecture of an IP address according to the present embodiment of the present invention. As illustrated in FIG. 10, a private ID field is provided between the subnet ID and the interface ID according to the present embodiment. The private ID constitutes a white net ID when combined with the subnet ID. From a viewpoint based on the architecture described in RFC 3587 illustrated in FIG. 7, the private ID corresponds to a part of the interface ID. From a viewpoint based on the architecture described in RFC 3513 illustrated in FIG. 9, the private ID corresponds to a part of the subnet ID, or a part of the interface ID.

Note that bidirectional arrows between the fields indicate that boundaries between the fields are not assumed to be fixed. Namely, the present embodiment may be applied to a case where the lengths of the fields are variable.

However, considering compatibility with the architecture described in RFC 3587, a case will be described where the global routing prefix has 48 bits and the subnet ID has 16 bits for the present embodiment.

Next, preparation work for building a white net will be described. For example, suppose that a subscriber organization determines a use range or an allocation range of IP addresses within the range of /64 to /80, based on the number of communication devices 20 and possible future expansion. In the present embodiment, the subscriber organization is referred to as a "company A". /64 means that a specific value of the upper 64 bits is assigned to the company A. Therefore, in this case, the company A can freely use the lower 64 bits. Also, /80 means that a specific value of the upper 80 bits is assigned to the company A. Therefore, in this case, the company A can freely use the lower 48 bits.

Next, in view of a usage form of the white net, the company A determines the number of required white nets, and determines the subnet mask. If the allocation range is /64 and the subnet mask is /80, the bit length of the white net ID is 32 bits, which is 16 bits of the subnet ID+16 bits of the private ID (the upper 16 bits of the interface ID). In this case, 4,294,967,296 white nets can be assigned at the maximum. Also, 28,147,497,671,656 IP addresses are available.

Among the items determined as above, for example, the company A makes an application of the allocation range to an ISP. Alternatively, the ISP may hear from the company A about its plan for the network configuration to determine the allocation range and the subnet mask suitable for the company A. Also, for each communication device 20 that is permitted to connect with a white net, the company A makes an application to indicate the MAC address, which is an example of specific information of the communication device 20, and information that indicates the owner of the communication device 20 to the ISP. In the following, the information is referred to as "device information". The owner of the communication devices 20 is the company A.

In response to receiving the application, the ISP provides a group of IP addresses that corresponds to the allocation range in the application. The provided group of IP addresses is managed, for example, by being associated with the subscriber ID of the company A. The subscriber ID is identification information with which the ISP identifies each subscriber. If the allocation range is /64, for example, a range of IP addresses, "2001:0 db8:aaaa:0000:0000:0000:0000:0001" to "2001:0 db8:aaaa:ffff:ffff:ffff:ffff:ffff", is provided.

Note that the device information for each of the communication devices 20 in the application is stored in the device information storage unit 37 of the certificate issuance apparatus 30.

Thus, the company A completes the preparation work for receiving the issuance of a device certificate for each of the communication devices 20. Note that, at this moment, the IP address of a communication device 20 is not determined. As described later, the IP address of a communication device 20 is determined with the issuance of a device certificate.

Next, a process will be described in which each of the communication devices 20 at the company A requests the issuance of a device certificate for connecting with a white net to the certificate issuance apparatus 30.

Figure 11:
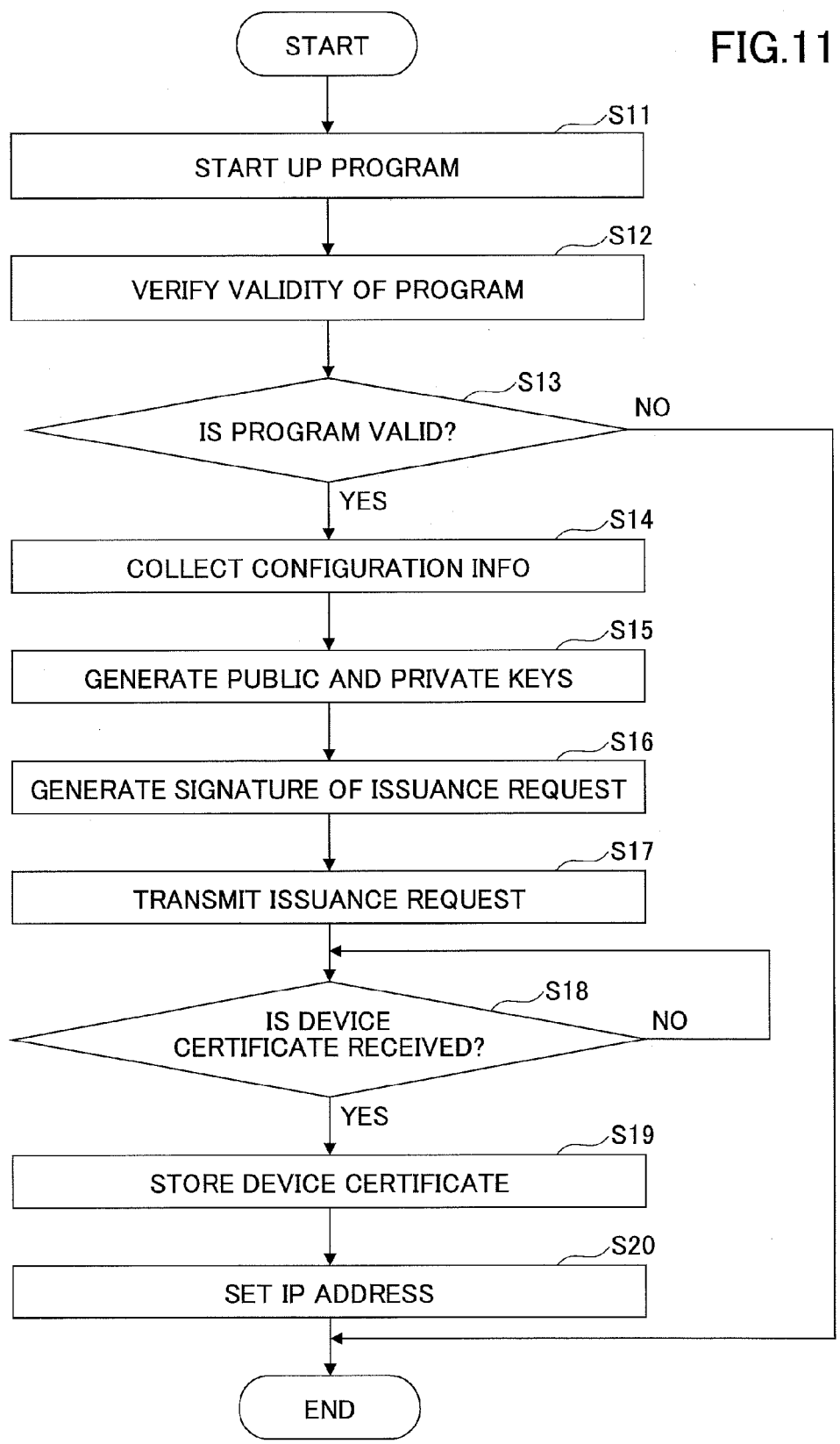
FIG. 11 is a flowchart illustrating an example of a procedure for an issuance request process of a device certificate.

FIG. 11 is a flowchart illustrating an example of a procedure for an issuance request process of a device certificate. Note that although the process in FIG. 11 is described for one communication device 20, the process is executed for every relevant communication device 20.

For example, when a communication device 20 is activated for the first time after connecting with the network, a program is activated in the security chip 206 (Step S11). The program is a program for having the security chip 206 function as the report generation unit 21, the certificate issuance request unit 22, the certificate reception unit 23, and the address setting unit 24. In the following, the program is called the "certificate obtainment program". The certificate obtainment program is stored in a memory of the security chip 206, for example, before factory shipment of the communication device 20. Alternatively, the certificate obtainment program may be stored outside of the security chip 206, for example, in the ROM 201 or the auxiliary storage unit 204. Note that timing when the process in FIG. 11 is executed may not be restricted to the timing when the communication device 20 is activated for the first time after connecting with the network. For example, the process may be executed every activation, or may be executed every predetermined interval. Also, if an expiration date is set for the device certificate, the process may be executed when the expiration date passes.

Next, the security chip 206 verifies validity of the activated certificate obtainment program (Step S12). Specifically, the activated certificate obtainment program generates a hash value of its own and outputs the hash value. On the other hand, the security chip 206 stores a hash value of the certificate obtainment program beforehand. The security chip 206 compares the hash value generated by the certificate obtainment program with the hash value stored beforehand. If both are equivalent, the validity of the certificate obtainment program is confirmed. Note that the validity here means "not falsified".

If the validity of the certificate obtainment program is denied (NO at Step S13), the process is not executed for Steps S14 and after. If the validity of the certificate obtainment program is confirmed (YES at Step S13), the certificate obtainment program has the security chip 206 execute Steps S14 and after.

At Step S14, the report generation unit 21 collects configuration information of the communication device 20. Namely, collection is executed for hardware configuration information and software configuration information. The hardware configuration information includes a device ID, the ID of the CPU 203, the ID of the RAM 202, the ID of the ROM 201, and the ID of the auxiliary storage unit 204. Other IDs may be included that are for hardware not illustrated. Note that the device ID is identification information for each of the communication devices 20 that is obtained by making a query to BIOS (Basic Input/Output System). The software configuration information includes a version of the BIOS, a version of the OS (Operating System), and hash values for files that constitute the OS. The files that constitute the OS include a file storing a program in an executable format or a file storing various setting information. The report generation unit 21 also obtains a MAC address from the interface unit 205, which is an example of specific information of the communication device 20. Note that, other than the MAC address or instead of the MAC address, "Validation Credential" may be obtained from the interface unit 205 to be used as the specific information of the communication device 20. "Validation Credential" is an electronic certificate of components that is defined in the specification of TPM. In the electronic certificate of network interface components (the interface unit 205 in the present embodiment), it is assumed that a manufacturer, a manufacturer's serial number, and a MAC address are described. However, details of the specification have not been determined at present.

The report generation unit 21 outputs the MAC address, report information that includes the hardware configuration information and the software configuration information, and a hash value of the report information.

Incidentally, a TPM can obtain information about each elements of hardware and software before activating the elements of the hardware and software. Therefore, if using a TPM as the security chip 206, it is possible to collect configuration information in a state before the setting information is rewritten with an activation of a communication device 20. Namely, it is possible to collect configuration information that is in the same state as before factory shipment.

Next, the certificate issuance request unit 22 generates a pair of public key and private key for the device certificate (Step S15). At least the private key is stored, for example, in the device certificate storage unit 26. Note that the generated public key and private key are called the "public key of the communication device 20" and the "private key of the communication device 20", respectively.

Next, the certificate issuance request unit 22 generates an electronic signature for the issuance request for the device certificate (Step S16). Specifically, the issuance request for the device certificate specifies, for example, data that indicates the issuance request such as a CSR (Certificate Signing Request), the report information, and the hash value of the report information. The issuance request also specifies the public key of the communication device 20, a global routing prefix mask, a subnet ID mask, and a private ID mask. The global routing prefix mask is the bit length of a global routing prefix counted from the head of an IP address. The subnet ID mask is the bit length of a subnet ID following the global routing prefix mask. The private ID mask is the bit length of the private ID following the subnet ID. These bit lengths need to be specified because these bit lengths are not assumed to be fixed in the present embodiment.

The certificate issuance request unit 22 generates a hash value for all information specified in the issuance request for the device certificate, and generates an electronic signature of the issuance request by encrypting the hash value with the private key of the security chip 206. Note that the private key of the security chip 206 differs from the private key of the communication device 20. The private key of the security chip 206 is stored in the security chip 206 beforehand as a private key for generating an electronic signature of the security chip 206.

Next, the certificate issuance request unit transmits the issuance request for the device certificate that has the generated electronic signature attached to the certificate issuance apparatus 30 (Step S17). Note that the IP address of the certificate issuance apparatus 30 may have been written in the security chip 206 or in the certificate obtainment program, or may be obtained via the network. Also, at this moment, a formal IP address has not been assigned to the communication device 20. Therefore, for example, a temporary IP address may be set to be used for communication. The temporary IP address may be assigned by DHCP (Dynamic Host Configuration Protocol).

After the issuance request for the device certificate has been transmitted by the certificate issuance request unit 22, the certificate reception unit 23 waits for a reply of the device certificate from the certificate issuance apparatus 30 (Step S18). In response to receiving the device certificate (YES at Step S18), the certificate reception unit 23 stores the device certificate in the device certificate storage unit 26 (Step S19). Next, the address setting unit 24 sets an IP address included in the device certificate in the communication control unit 25 of the communication device 20 (Step S20).

Next, a process will be described that is executed by the certificate issuance apparatus 30 in response to the issuance request for the device certificate transmitted by the communication device 20 at Step S17 in FIG. 11.

Figure 12:
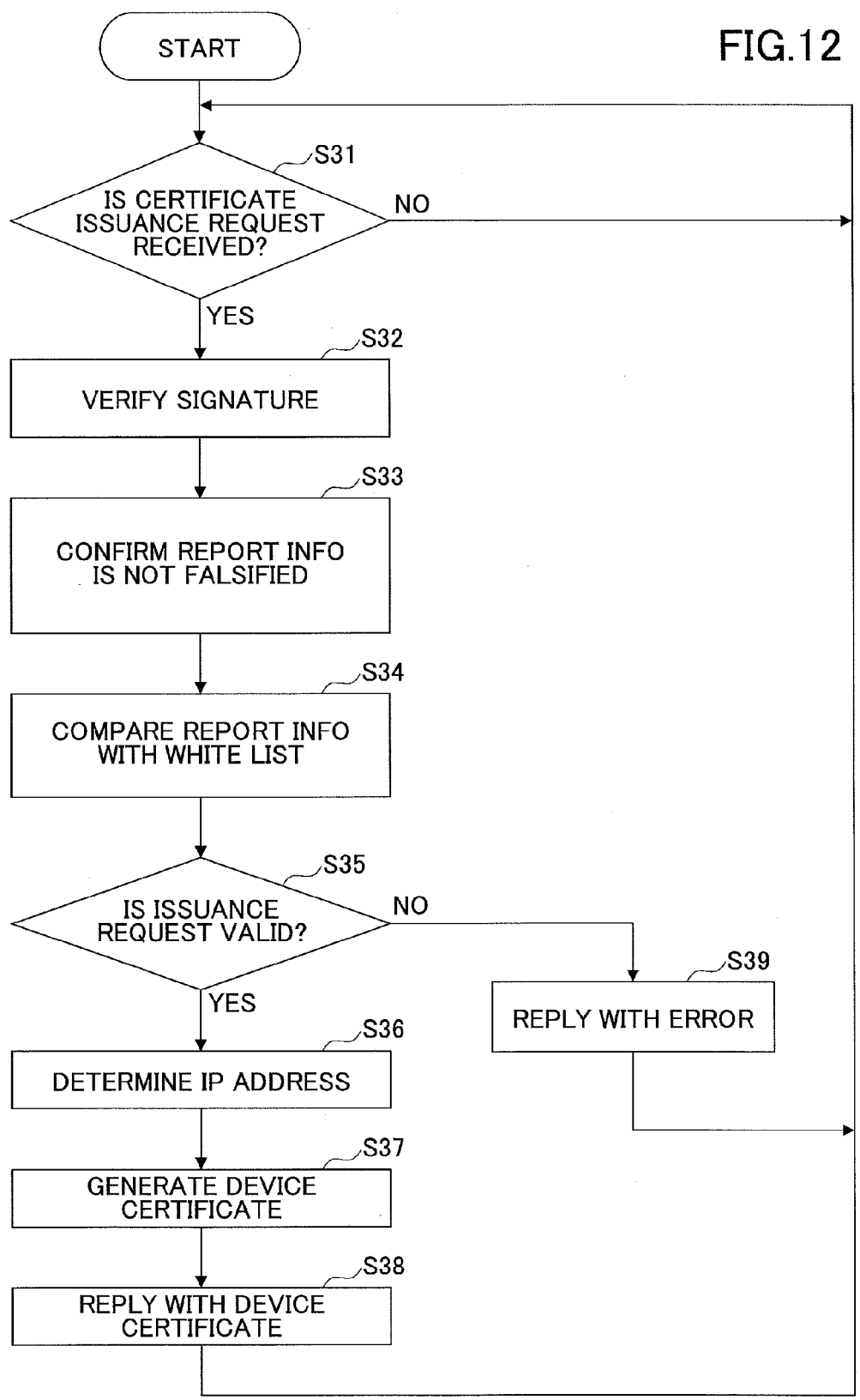
FIG. 12 is a flowchart illustrating an example of a procedure for an issuance process of a device certificate.

FIG. 12 is a flowchart illustrating an example of a procedure for an issuance process of a device certificate.

The issuance request reception unit 31 of the certificate issuance apparatus 30 waits for reception of an issuance request of a device certificate (Step S31). When an issuance request of a device certificate is received by the issuance request reception unit 31 (YES at Step S31), the issuance request verification unit 32 verifies the electronic signature attached to the issuance request (Step S32). Specifically, the public key certificate of the security chip 206 is stored in the auxiliary storage unit 302 of the certificate issuance apparatus 30. The public key certificate includes the public key corresponding to the private key of the security chip 206. The issuance request verification unit 32 decrypts the electronic signature with the public key. The issuance request verification unit 32 also calculates a hash value of the issuance request, and compares the calculated hash value with the hash value obtained by decrypting the electronic signature. If both are equivalent, it is confirmed that the transmission source of the issuance request is valid and the issuance request is not falsified.

Next, the issuance request verification unit 32 calculates a hash value of the report information included in the issuance request, and compares the calculated hash value with the hash value of the report information included in the issuance request to confirm that the report information is not falsified (Step S33). Next, the issuance request verification unit 32 compares the report information with a record stored in the white list storage unit 36 (Step S34).

FIG. 13 is a schematic view illustrating an example of a configuration of the white list storage unit 36. Each record in the white list storage unit 36 stores a right answer or a model answer of report information of a communication device 20 relating to the device ID, which is associated with the device ID. In FIG. 13, an example is illustrated in which a record is constituted with hardware configuration information including an ID of the CPU and an ID of the auxiliary storage unit, software configuration information including a version of BIOS, a version of an OS, and hash values of files constituting the OS, and the MAC address. Note that the IDs of the hardware, the versions of the software and the like, and the MAC address may be converted to hash values.

At Step S34, the issuance request verification unit 32 searches for report information in the white list storage unit 36 that is associated with the device ID included in the report information specified in the issuance request. The issuance request verification unit 32 compares the report information specified in the issuance request with the search-found report information. Namely, it is determined whether a combination of the configuration information and the MAC address of the communication device 20 included in the report information specified in the issuance request is equivalent to the right answer or the model answer stored beforehand in the white list storage unit 36.

If both are equivalent, the issuance request verification unit 32 determines that the issuance request is valid. Note that, at Step S34, it is confirmed that the communication device 20 of the issuance request source has a regular or predetermined configuration or is in a regular or predetermined state. For example, it is confirmed that a program installed in the communication device 20 has not been falsified.

In this way, the report information stored in the white list storage unit 36 is used for verifying validity of an issuance request of a device certificate. Therefore, the report information may be made able to be obtained, for example, from a reliable source other than the company A. A possible source of the report information may be, for example, a sales company or a manufacturer of the communication device 20 for the company A. For example, in response to a request from the ISP, the sales company or manufacturer provides report information of communication devices 20 in a state before shipment to the ISP, which are to be sold for the company A. The ISP sets the provided report information in the white list storage unit 36.

By having an obtainment source of the device information to be stored in the white list storage unit 36 that is different from the source of the issuance request for the device certificate, the white list storage unit 36 can be made more reliable. For example, it raises the likelihood to detect whether a received issuance request is not the one for a communication device 20 in the company A.

If the issuance request is determined as illegal with Steps S32-S34 (NO at Step S35), the response transmission unit 35 replies with error information (Step S39) to complete the process for responding to the issuance request. Namely, in this case, the issuance of a device certificate is not executed.

On the other hand, if the issuance request is determined as valid with Steps S32-S34 (YES at Step S35), the address determination unit 33 determines the IP address of the communication device 20 that is the source of the issuance request by referring to the device information storage unit 37 (Step S36).

FIG. 14 is a schematic view illustrating an example of a configuration of the device information storage unit 37. In FIG. 14, each record in the device information storage unit 37 stores a MAC address, an IP address, a domain name, an owner name, an address, and a telephone number, and the like.

The MAC address is the MAC address of a communication device 20. The IP address is an IP address assigned to the communication device 20 having the MAC address. The domain name is a domain name of the communication device 20. The owner name is a name of an owner of the communication device 20. In the present embodiment, the company A is the owner of the communication device 20. The address and telephone number are an address and a telephone number of the owner.

At Step S36, an IP address is obtained from the device information storage unit 37 that is associated with the MAC address included in the report information specified in the issuance request. The IP address is determined as the IP address of the communication device 20 that is the source of the issuance request.

Note that the interface ID in the IP address of the communication device 20 that is the source of the issuance request may be dynamically generated in response to the issuance request for the device certificate. For example, the interface ID of the IP address may be calculated based on the specific information such as the MAC address of the communication device 20 that is the source of the issuance request.

Next, the certificate generation unit 34 generates the device certificate for the communication device 20 that is the source of the issuance request (Step S37).

FIG. 15 is a schematic view illustrating an example of a configuration of a device certificate. The device certificate illustrated in FIG. 15 is compliant with X509 v3 format, and description of the basic fields is omitted. Note that the public key of a communication device 20 specified in an issuance request is stored in the subjectPublicKeyInfo field.

The extensions field is a field defined in X509 v3. In the present embodiment, extensions (exInd) include an IP address (IPv6 global unicast address), a global routing prefix mask, a subnet ID mask, a private ID mask, and a MAC address. Among these extensions, values of the global routing prefix mask, the subnet ID mask, the private ID mask, and the MAC address are set with values specified in the issuance request for the device certificate. On the other hand, the IP address is set with the value determined at Step S36.

Next, the response transmission unit 35 replies with the generated device certificate (Step S38).

The communication device 20 in which the device certificate is stored at the company A can communicate in a white net that corresponds to the device certificate. The white net that corresponds to the device certificate is a white net that can be identified by a white net ID, which is in turn identified based on the IP address, the global routing prefix mask, the subnet ID mask, and the private ID mask recorded in the device certificate.

Figure 16:
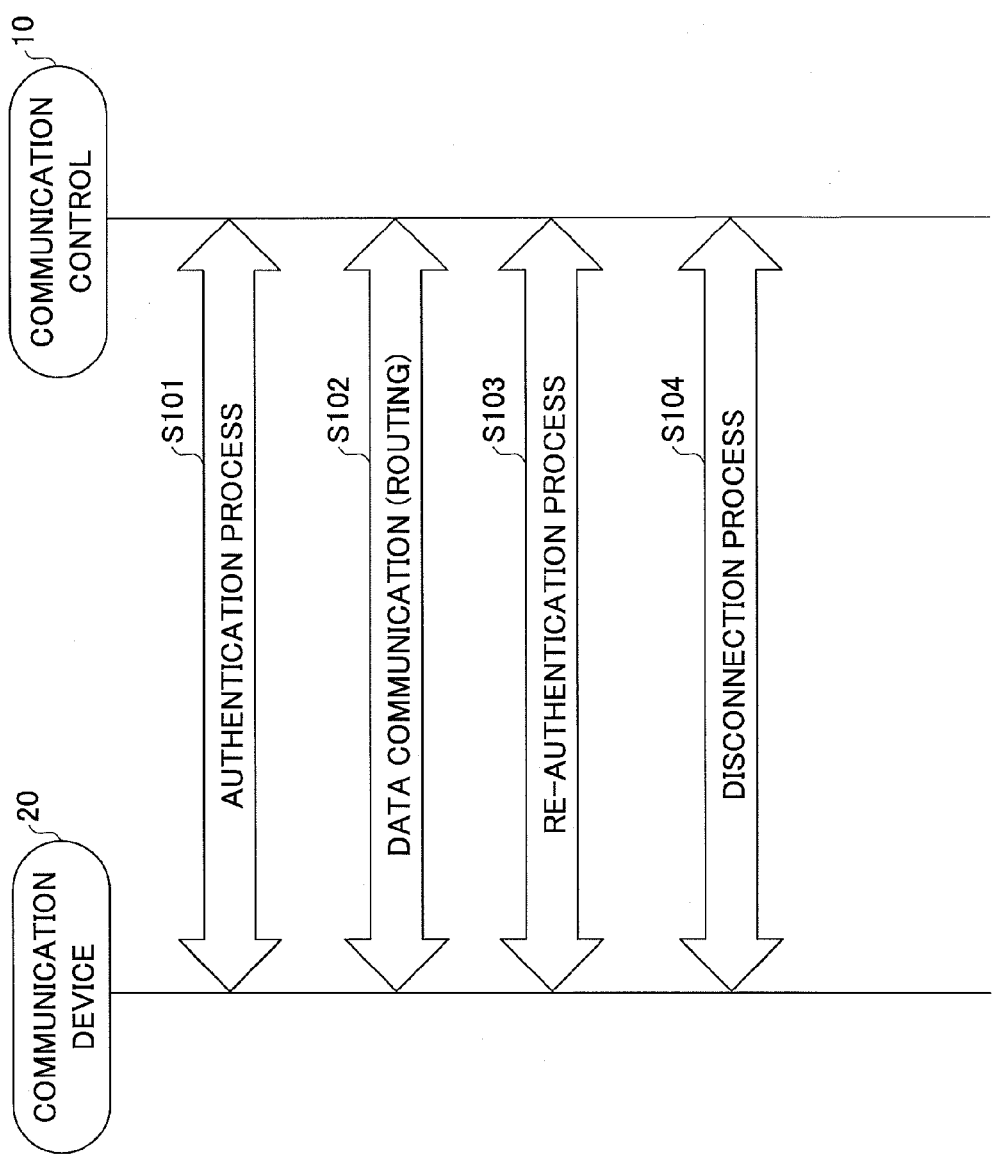
FIG. 16 is a schematic view illustrating a series of steps of a communication process using a white net.

Next, a communication process will be described that uses a white net. FIG. 16 is a schematic view illustrating a series of steps of a communication process using a white net.

First, an authentication process is executed by the communication control apparatus 10 for a communication device 20 that requests to connect with a white net (Step S101). The authenticated communication device 20 is logically included in the white net that corresponds to the device certificate of the communication device 20. Also, a symmetric key for encrypted communication is shared between the communication control apparatus 10 and the communication device 20 in the authentication process.

Next, usual data communication is executed (Step S102). A packet of the communication device 20 included in the white net is routed by the communication control apparatus 10. Note that, in data communication, whether to transmit data to the outside of the white net or whether to permit reception of data from the outside of the white net depends on a routing policy that is set for each of the white nets.

During the data communication, a re-authentication process is executed for the communication device 20 at predetermined timing (Step S103). Namely, validity of the communication device 20 is confirmed, for example, periodically. When the data communication completes, the communication device 20 disconnects the connection with the white net (Step S104).

Figure 17:
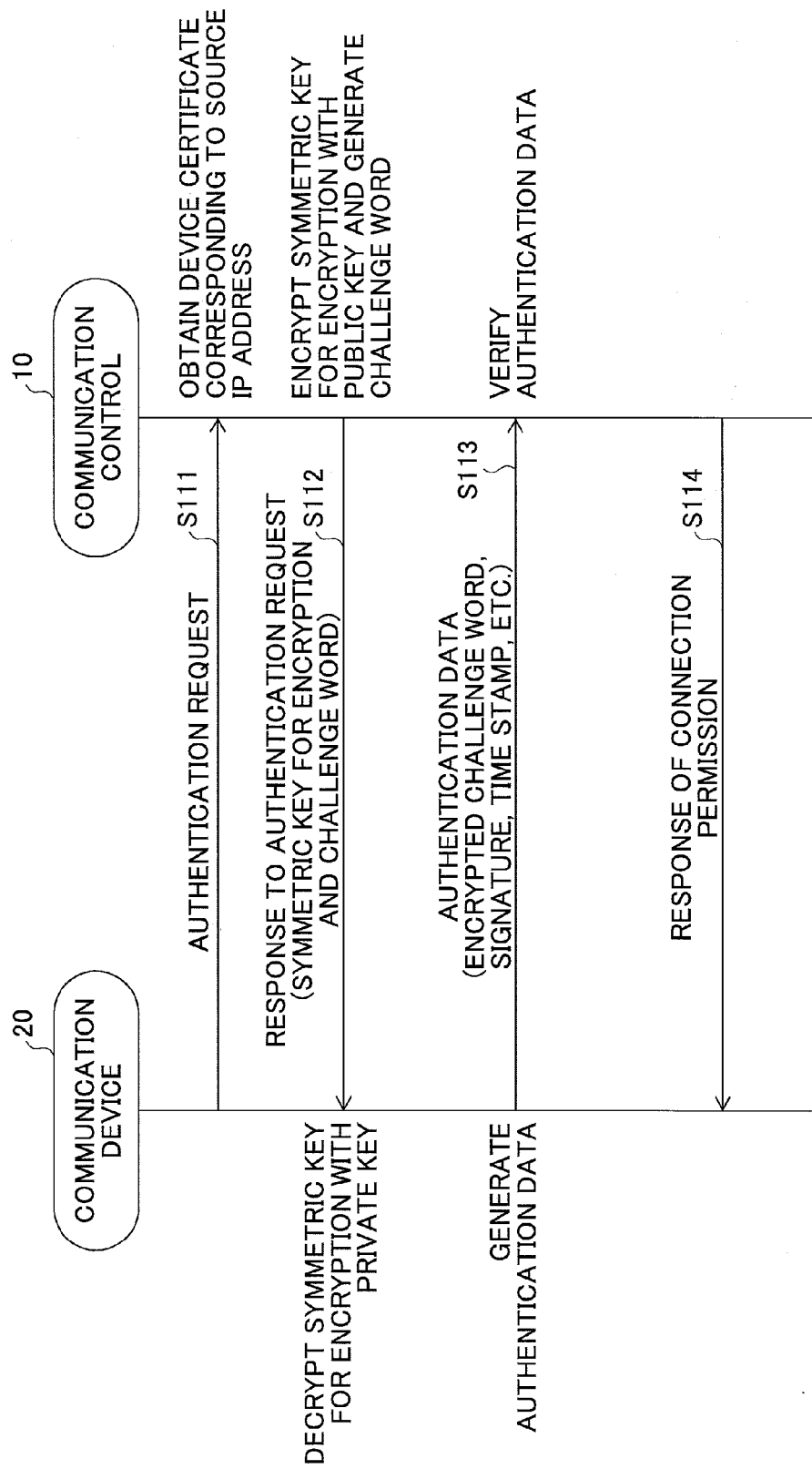
FIG. 17 is a sequence chart illustrating an example of an authentication process of a communication device.

Next, Step S101 will be described in detail. FIG. 17 is a sequence chart illustrating an example of an authentication process of a communication device 20.

At Step S111, the communication control unit 25 of the communication device 20 transmits a packet that indicates an authentication request to the communication control apparatus 10. A packet that indicates an authentication request is, for example, a packet that includes information indicating an authentication request. In the following, a packet that indicates an authentication request is simply called an "authentication request". When the authentication request is received at the communication control apparatus 10, the authentication request reception unit 11 obtains a device certificate associated with the transmission source IP address of the authentication request from the certificate list storage unit 15. The authentication request reception unit 11 also stores time information that indicates the received time of the authentication request.

Note that, if a corresponding device certificate is not stored in the certificate list storage unit 15, the authentication request reception unit 11 may obtain the device certificate for the communication device 20 of the authentication request source via the network. For example, the corresponding device certificate may be obtained by requesting transmission of the device certificate to the communication device 20 or by requesting obtainment of the device certificate for the transmission source IP address of the authentication request from a site where the device certificate is made open to the public. The obtained device certificate is stored in the certificate list storage unit 15. Also, the authentication request at Step S111 may be specified with the device certificate of the communication device 20 that is the authentication request source.

Next, the authentication request reception unit 11 generates a symmetric key for encryption that is unique for each authentication process for the communication device 20, and encrypts the symmetric key for encryption with the public key included in the device certificate of the communication device 20. Also, the authentication request reception unit 11 randomly generates a challenge word or a challenge phrase (called a "challenge word", hereafter), returns the challenge word and an authentication request response packet that includes the encrypted symmetric key for encryption to the transmission source IP address of the authentication request (Step S112). A challenge word is a random string.

When the authentication request response packet is received at the communication device 20, the communication control unit 25 decrypts the encrypted symmetric key for encryption included in the authentication request response packet with the private key of the communication device 20. If an invalid communication device 20 that performs spoofing or the like receives the authentication request response packet, the invalid communication device 20 does not have the private key that can decrypt the encrypted symmetric key for encryption. Therefore, the communication device 20 cannot decrypt the encrypted symmetric key for encryption, which prevents the symmetric key for encryption from leaking. The decrypted symmetric key for encryption is saved in a safe place while the session is valid, for example, and discarded when the session ends.

The communication control unit 25 also encrypts the challenge word with the symmetric key for encryption, and generates an electronic signature for the encrypted challenge word. The electronic signature is generated by encrypting the hash value of the encrypted challenge word with the private key of the communication device 20. The private key is read from the device certificate storage unit 26. Alternatively, encryption of the hash value of the challenge word may be executed by the security chip 206. Further, the communication control unit 25 obtains a time stamp of current time, for example, from a third-party authentication organization.

Next, the communication control unit 25 transmits a packet that includes authentication data such as the encrypted challenge word, the electronic signature, and the time stamp, to the communication control apparatus 10 (Step S113). In the following, a packet that includes authentication data is called an "authentication data packet". Note that the transmission source IP address of a packet transmitted by the communication control unit 25 such as an authentication data packet is an IP address set by the communication control unit 25 at Step S20 that is included in the device certificate obtained with the process in FIG. 11.

In the communication control apparatus 10, when an authentication data packet is received, the authentication data verification unit 12 verifies the authentication data. Specifically, the authentication data verification unit 12 verifies validity of an elapsed time between time indicated by the time stamp included in the authentication data and time indicated by the time information stored in response to reception of the authentication request. If the elapsed time is less than a predetermined value, the authentication data verification unit 12 determines that the elapsed time is valid. The determination is to detect whether the authentication data is illicitly intercepted, assuming that the likelihood is high in that the elapsed time tends to be long if an invalid interception has been performed and the authentication data is transmitted from the interceptor.

The authentication data verification unit 12 also verifies the electronic signature included in the authentication data using the device certificate. The authentication data verification unit 12 also decrypts the challenge word included in the authentication data with the symmetric key for encryption, and verifies whether the decrypted result is equivalent to the transmitted challenge word. The authentication data verification unit 12 further compares the transmission source IP address in the authentication data packet with the IP address included in the device certificate obtained at Step S111, and if both are equivalent, the transmission source IP address of the authentication data packet is determined as valid.

In sum, it is verified that no spoofing has been performed for the communication device 20 by the verification of the electronic signature. Also, by confirming that the challenge word can be decrypted, it is verified that the symmetric key for encryption is safely transferred to the communication device 20. By comparing the transmission source IP address with the IP address in the device certificate, validity of the IP address in the communication device 20 can be verified.

Having verified validity of all of the electronic signature, the challenge word, and the transmission source IP address, the authentication data verification unit 12 admits the communication device 20 to be included in the white net that corresponds to the device certificate of the communication device 20. Namely, the communication device 20 is permitted to connect with the white net. Then, the authentication request reception unit 11 replies with a connection permission response that indicates permission for connecting with the white net to the transmission source IP address of the authentication data packet (Step S114).

Figure 18:
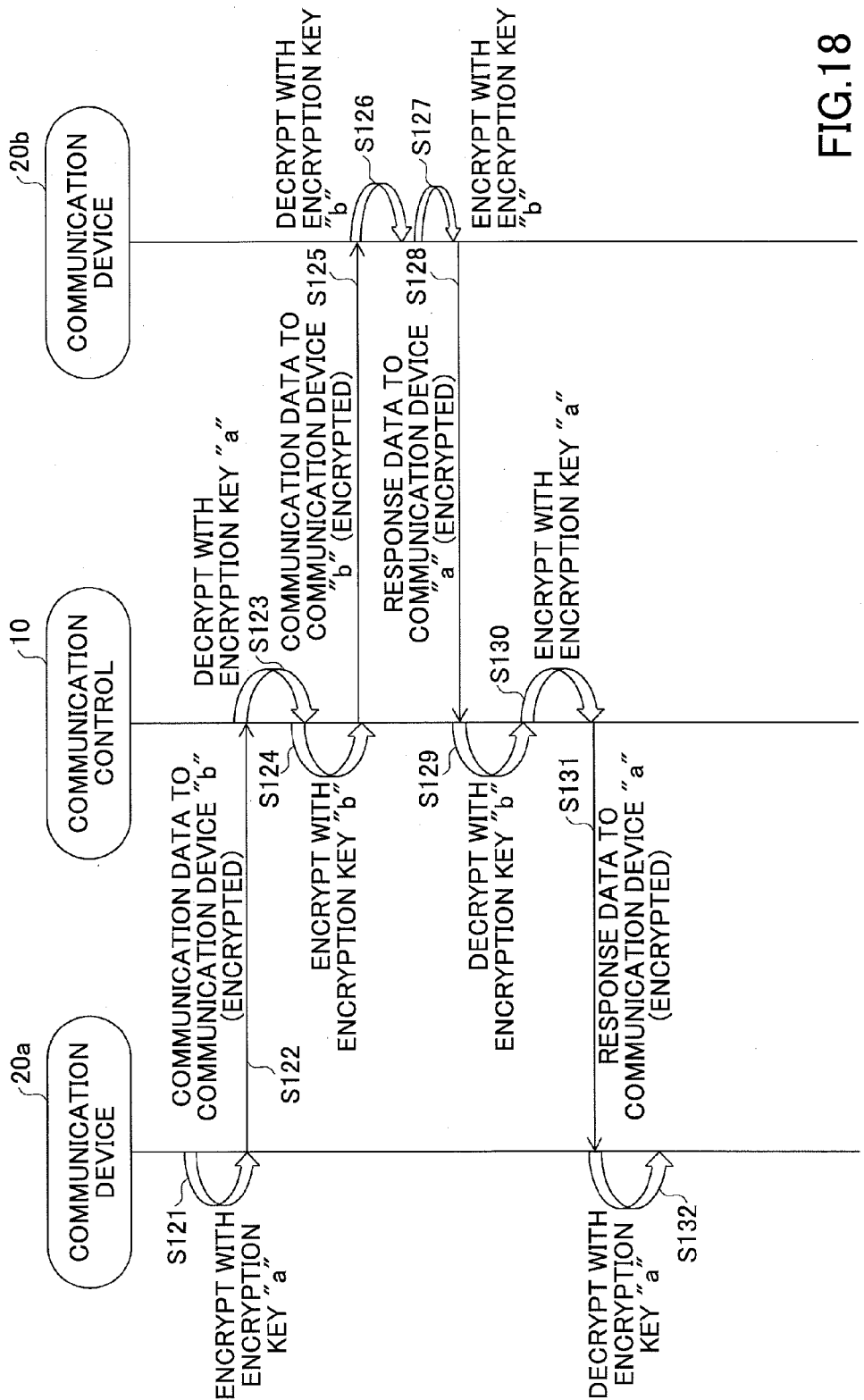
FIG. 18 is a sequence chart illustrating an example of a procedure for data communication via a white net.

Next, Step S102 in FIG. 16 will be described in detail. FIG. 18 is a sequence chart illustrating an example of a procedure for data communication via a white net. In FIG. 18, an example will be described in which communication is executed between a communication device 20a and a communication device 20b. Suppose that the communication device 20a and the communication device 20b have the process in FIG. 17 applied, respectively, and are included in the same white net or mutually different white nets.

At Step S121, the communication control unit 25a of the communication device 20a encrypts communication data for the communication device 20b with an encryption key "a". The encryption key "a" is a symmetric key for encryption that has been received from the communication control apparatus 10 at Step S112 in FIG. 17. Next, the communication control unit 25a transmits a packet including the encrypted communication data to the IP address of the communication device 20b (Step S122).

The packet is received by the communication control apparatus 10 via the network N1. The routing unit 13 of the communication control apparatus 10 decrypts the communication data included in the packet from the communication device 20a with the encryption key "a" (Step S123). Next, the routing unit 13 encrypts the decrypted communication data with a symmetric key for encryption for the communication device 20b corresponding to the destination IP address of the packet (called the "encryption key b", hereafter) (Step S124). Namely, the communication control apparatus 10 stores the symmetric key for encryption generated for each authenticated communication device 20, for example, in the auxiliary storage unit of the communication control apparatus 10 by associating it with the IP address of the communication device 20, which has the authentication process in FIG. 17 applied to be included in the white net.

Next, the routing unit 13 transfers the packet including the communication data encrypted by the encryption key "b" to the communication device 20b via the network N1 (Step S125).

Note that, in a strict sense, the routing unit 13 also determines whether routing is permitted from the communication device 20a to the communication device 20b (communication data transfer) based on a routing policy, which will be described later.

In response to receiving the communication data, the communication control unit 25b of the communication device 20b decrypts the communication data with the encryption key "b" (Step S126). The encryption key "b" has been received from the communication control apparatus 10 also at Step S112 in FIG. 17 for the communication device 20b. Note that the encryption key "a" and the encryption key "b" are different encryption keys usually. This is because a symmetric key for encryption is generated for each authentication process as described with Step S112.

Next, the communication device 20b executes a process that uses, for example, the decrypted communication data. Next, the communication control unit 25b encrypts response data corresponding to the received communication data with the encryption key "b" (Step S127). The response data may be, for example, data that indicates a processed result by the communication device 20b, or data indicating that the communication data has been received. Next, the communication control unit 25b replies with a packet including the encrypted response data to the IP address of the communication device 20a (Step S128).

The packet is received by the communication control apparatus 10 via the network N1. The routing unit 13 of the communication control apparatus 10 decrypts the response data included in the packet with the encryption key "b" corresponding to the transmission source IP address of the packet (Step S129). Next, the routing unit 13 encrypts the decrypted response data with the encryption key "a" for the communication device 20a corresponding to the destination IP address of the packet (Step S130). Next, the routing unit 13 transfers the packet including the response data encrypted by the encryption key "a" to the communication device 20a via the network N1 (Step S131).

In response to receiving the response data, the communication control unit 25a of the communication device 20a decrypts the response data with the encryption key "a" (Step S132). The communication device 20a executes a process that uses, for example, the decrypted response data.

In this way, communications between the communication devices 20 and the communication control apparatus 10 are encrypted with the symmetric key for encryption for the authentication process of the respective communication devices 20. Therefore, data communication is highly secured for safety. Also, communication using the symmetric key for encryption for each of the communication devices 20 is intervened by the communication control apparatus 10. Therefore, there is no need to exchange a symmetric key for encryption between a pair of communication devices 20. Namely, each of the communication devices 20 does not need to switch a symmetric key for encryption to be used depending on a communication counterpart.

Figure 19:
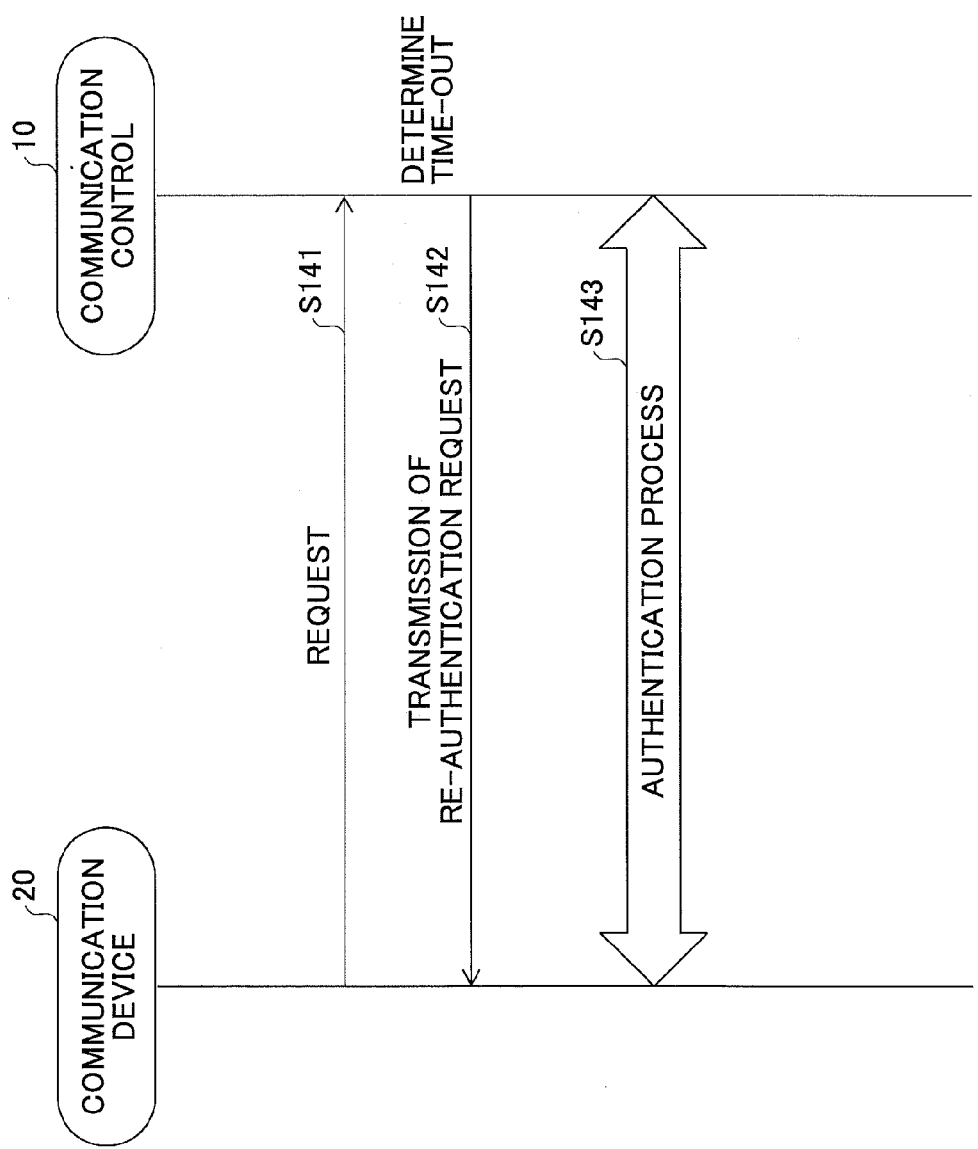
FIG. 19 is a sequence chart illustrating an example of a procedure for a re-authentication process in a white net.

Next, Step S103 in FIG. 16 will be described in detail. FIG. 19 is a sequence chart illustrating an example of a procedure for a re-authentication process in a white net.

For example, the communication control unit 25 of the communication device 20 transmits a packet including communication data (Step S141). Step S141 is substantially the same step as Step S122 in FIG. 18. In response to receiving the packet, the re-authentication request unit 14 of the communication control apparatus 10 determines whether it is a time-out for a session relating to the transmission source IP address of the packet. For example, it is determined whether a predetermined time has passed since time of last communication for the session. Note that although it is omitted in FIG. 18 for convenience's sake, the determination is executed for every time when receiving a packet from the communication device 20.

Detecting a time-out, the re-authentication request unit 14 transmits a re-authentication request to the transmission source IP address (Step S142). In response to the re-authentication request, the communication control unit 25 of the communication device 20 starts an authentication process as described in FIG. 17 (Step S143).

Next, steps executed by the communication control apparatus 10 during the processes described in FIGS. 16-19 will be further explained.

Figure 20:
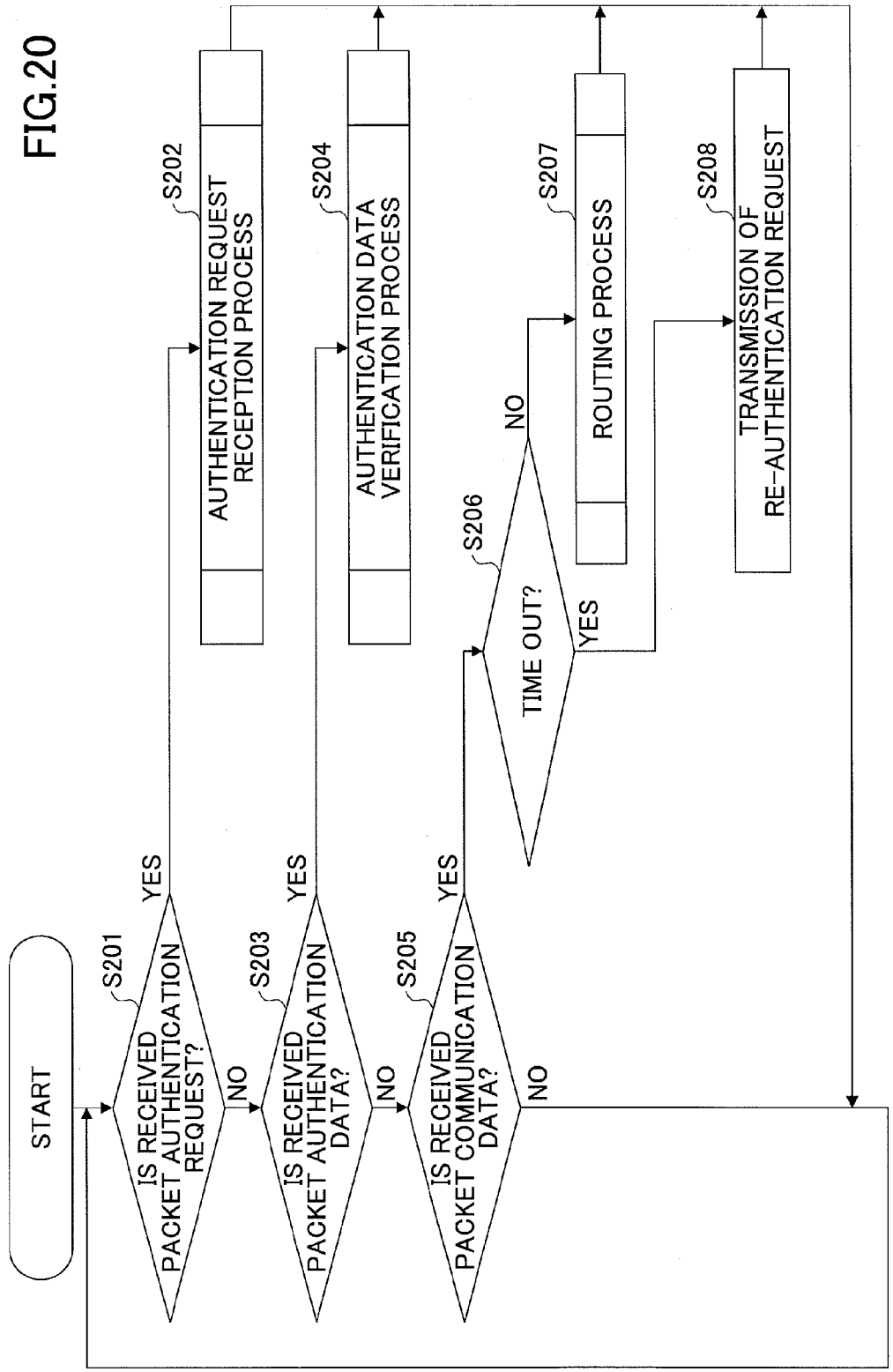
FIG. 20 is a flowchart illustrating an example of a procedure executed by a communication control apparatus.

FIG. 20 is a flowchart illustrating an example of a procedure executed by the communication control apparatus 10.

The communication control apparatus 10 waits for reception of a packet. If the received packet is an authentication request (YES at Step S201), the authentication request reception unit 11 executes an authentication request reception process (Step S202). If the received packet is a packet including authentication data (YES at Step S203), the authentication data verification unit 12 executes an authentication data verification process (Step S204).

If the received packet is a packet including communication data, namely, a packet having a destination other than the communication control apparatus 10 (YES at Step S205), the re-authentication request unit 14 determines whether it is a time-out for a session relating to the transmission source IP address of the packet (Step S206). If it is not a time-out (NO at Step S206), the routing unit 13 executes a routing process for the packet (Step S207). If it is a time-out (YES at Step S206), the re-authentication request unit 14 transmits a re-authentication request to the transmission source IP address of the packet (Step S208).

Figure 21:
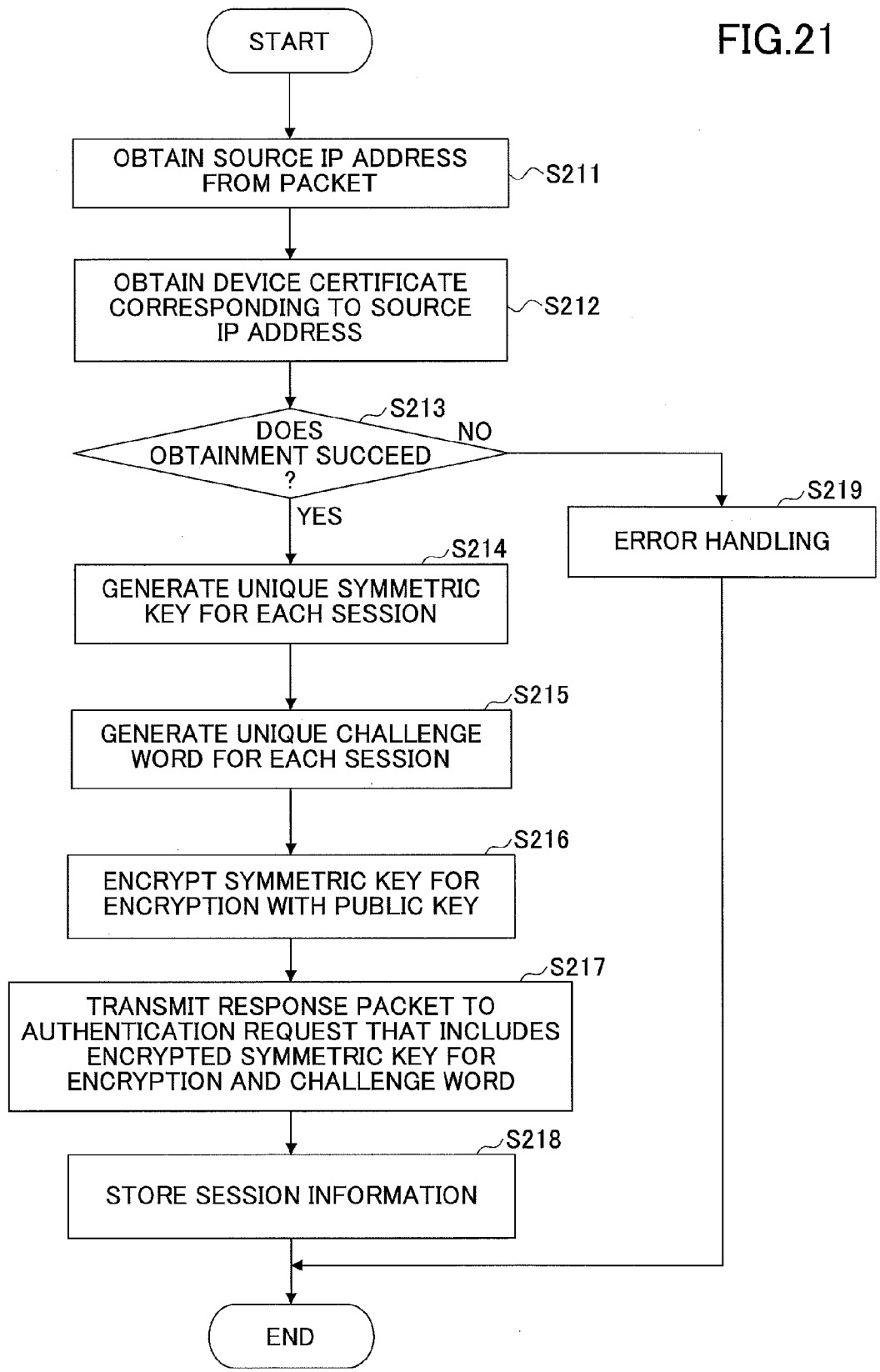
FIG. 21 is a flowchart illustrating an example of a procedure for an authentication reception process.

Next, Step S202 will be described in detail. FIG. 21 is a flowchart illustrating an example of a procedure for an authentication reception process.

At Step S211, the authentication request reception unit 11 obtains a transmission source IP address from the authentication request. Next, the authentication request reception unit 11 obtains a device certificate that corresponds to the transmission source IP address from the certificate list storage unit 15 (Step S212). If failing in obtaining the corresponding device certificate (NO at Step S213), the authentication request reception unit 11 executes error handling (Step S219). For example, the re-authentication request is transmitted to the transmission source IP address. Alternatively, the device certificate of the transmission source IP address may be obtained from the communication device or a site where the device certificate is made open to the public. Even if the device certificate is obtained in this way, Steps S214 and after are executed.

If succeeding in obtaining the corresponding device certificate (YES at Step S213), the authentication request reception unit 11 generates a unique symmetric key for encryption for each session with the communication device 20 (Step S214). Next, the authentication request reception unit 11 generates a unique challenge word for each session (Step S215). Next, the authentication request reception unit 11 encrypts the symmetric key for encryption with a public key stored in the device certificate obtained at Step S212 (Step S216). Next, the authentication request reception unit 11 transmits an authentication request response packet that includes the encrypted symmetric key for encryption and the challenge word to the transmission source IP address of the authentication request (Step S217).

Next, the authentication request reception unit 11 generates a record that corresponds to the communication device 20 of the authentication request source in the session information storage unit 16, and stores (Step S218) session information about the communication device 20 in the record.

FIG. 22 is a schematic view illustrating an example of a configuration of the session information storage unit 16. As illustrated in FIG. 22, the session information storage unit 16 stores, for each session, a subnet address, a session ID, a connection source IP, a connection destination IP, a state, a symmetric key for encryption, a challenge word, authentication request time, and last response time, and the like.

The subnet address is an address in a white net with which a communication device 20 relating to the session make a connection. Namely, the subnet address is a field that corresponds to the subnet mask in the IP address of the communication device 20. The subnet mask covers a range that includes fields for the global routing prefix, the subnet ID, and the private ID.

The session ID is an identifier that is assigned for each session. The connection source IP is an IP address of the communication device 20 that is the connection source of the session. The connection destination IP is an IP address of the communication device 20b which is the connection destination of the communication device 20a relating to the connection source IP in data communication described in FIG. 18. The state is a state of the session. The symmetric key for encryption is a symmetric key for encryption that is used for communication between the communication device 20 and the communication control apparatus 10 relating to the session. The challenge word is a challenge word that is generated for the session. The authentication request time is time when an authentication request is received. The last response time is time when a last response is made to the request from the communication device 20 relating to the session.

At Step S218, the subnet address, the session ID, the connection source IP, the state, the symmetric key for encryption, the challenge word, and the like are set in the newly generated record. The subnet address can be derived from an IP address, a global routing prefix mask, a subnet ID mask, and a private ID mask that are stored in the device certificate (FIG. 15) obtained at Step S212. The session ID is set with a unique value that is generated for each session. The connection source IP is set with the transmission source IP address of the authentication request. The state is set with "INITIALIZING". The symmetric key for encryption is set with the symmetric key for encryption that has been generated at Step S214. The challenge word is set with the challenge word that has been generated at Step S215. The authentication request time is set with current time.

Figure 23:
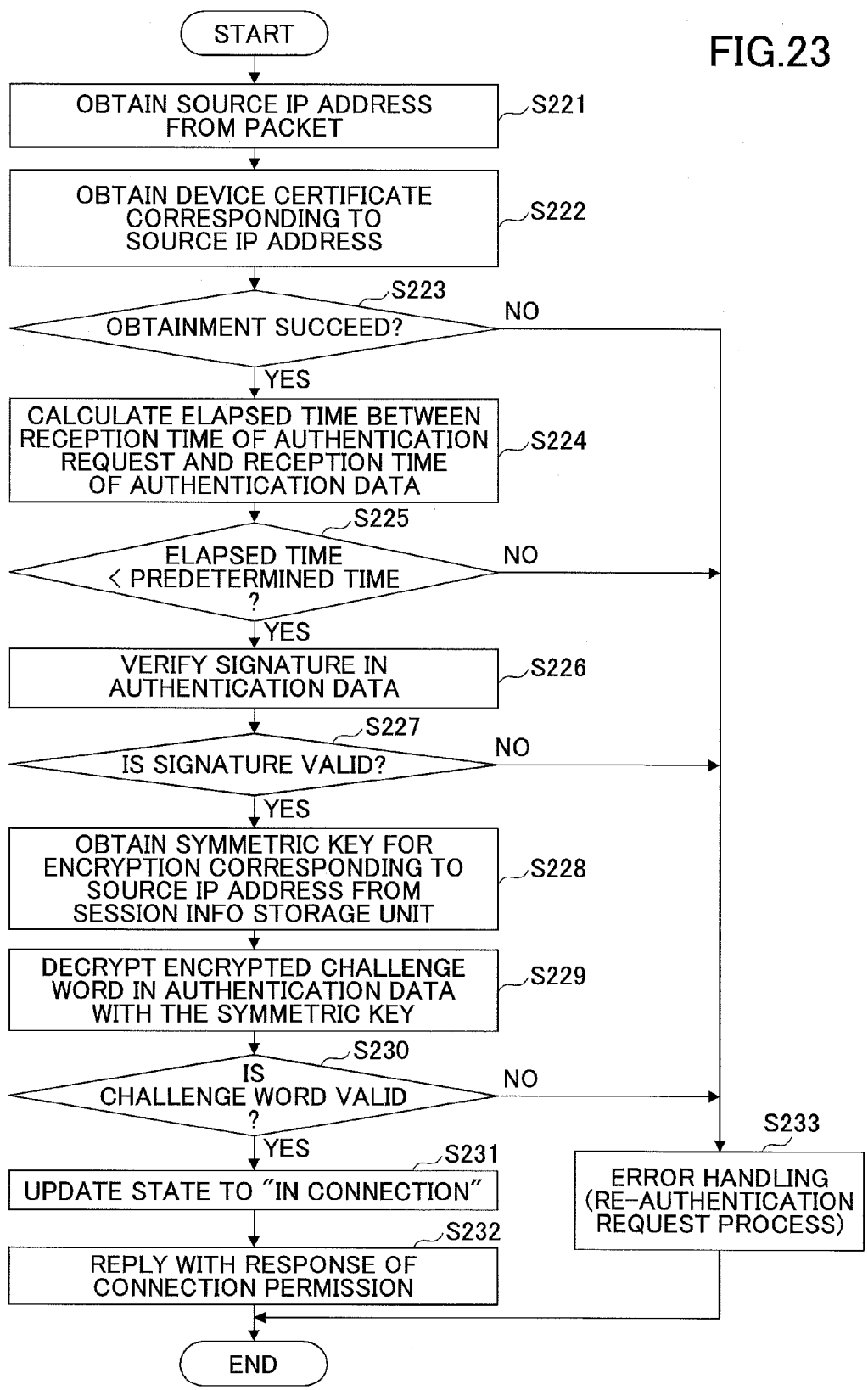
FIG. 23 is a flowchart illustrating an example of a procedure for an authentication data verification process.

Next, Step S204 in FIG. 20 will be described in detail. FIG. 23 is a flowchart illustrating an example of a procedure for an authentication data verification process.

At Step S221, the authentication data verification unit 12 obtains the transmission source IP address from the packet that includes authentication data. Next, the authentication data verification unit 12 obtains the device certificate that corresponds to the transmission source IP address from the certificate list storage unit 15 (Step S222). If succeeding in obtaining the corresponding device certificate (YES at Step S223), the authentication data verification unit 12 calculates elapsed time from reception of the authentication request to reception of the authentication data, based on the time stamp included in the authentication data (Step S224). The elapsed time can be calculated by obtaining a difference between the authentication request time, which is included in the corresponding record in the session information storage unit 16 that also includes the obtained transmission source IP address as the connection source IP obtained at Step S221, and time indicated by the time stamp.

Next, the authentication data verification unit 12 determines whether the calculated elapsed time is less than a predetermined value (Step S225). If the calculated elapsed time is less than a predetermined value (YES at Step S225), the authentication data verification unit 12 verifies the electronic signature included in the authentication data (Step S226). Verification of the electronic signature is executed using the public key included in the device certificate obtained at Step S222. Namely, the electronic signature is determined to be valid if a decrypted result of the electronic signature with the public key is equivalent to the hash value of the challenge word stored in the session information storage unit 16 that is associated with the transmission source IP address of the authentication data packet.

If the electronic signature is valid (YES at Step S227), the authentication data verification unit 12 obtains the symmetric key for encryption that is associated with the source address of the authentication data packet from the session information storage unit 16 (Step S228). Next, the authentication data verification unit 12 decrypts the challenge word included in the authentication data with the symmetric key for encryption (Step S229).

Next, the authentication data verification unit 12 compares the decrypted challenge word with the challenge word stored in the session information storage unit 16 that is associated with the source address of the authentication data packet, to verify validity of the challenge word included in the authentication data (Step S230). If both are equivalent (YES at Step S230), the authentication data verification unit 12 updates the value of the state stored in the session information storage unit 16 into "IN CONNECTION", which is associated with the source address of the authentication data packet (Step S231). Next, the authentication data verification unit 12 replies with a connection permission response that indicates permission for connecting with the white net to the transmission source IP address of the authentication data packet (Step S232).

On the other hand, the authentication data verification unit 12 executes error handling (Step S233) if one of the following conditions are satisfied: it fails in obtaining the corresponding device certificate at Step S222 (NO at Step S223); the calculated elapsed time turns out to be greater than or equal to the predetermined value at Step S224 (NO at Step S225); the electronic signature or the challenge word included in the authentication data is illegal (NO at Step S227 or NO at Step S230). In the error handling, for example, a re-authentication request is transmitted to the transmission source IP address.

Figure 24:
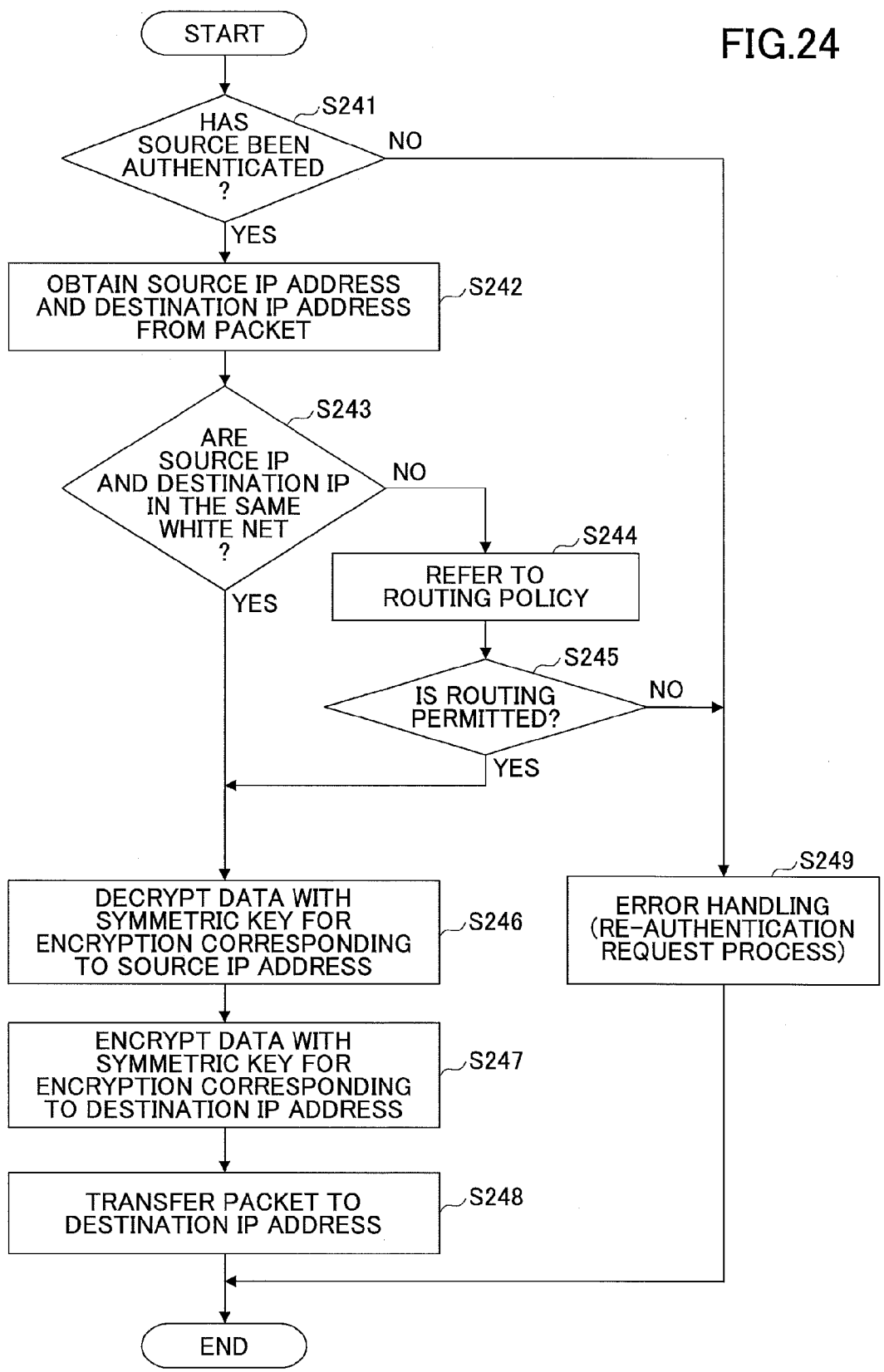
FIG. 24 is a flowchart illustrating an example of a procedure for a routing process.

Next, Step S207 in FIG. 20 will be described in detail. FIG. 24 is a flowchart illustrating an example of a procedure for a routing process.

At Step S241, the routing unit 13 determines whether the communication device 20 is authenticated, which is the transmission source of the packet including the communication data. Specifically, the communication device 20 is determined as authenticated if a record including the transmission source IP address of the packet as the connection source IP is stored in the session information storage unit 16, and the value of the state in the record is "IN CONNECTION". If the above condition is not satisfied, the communication device 20 is determined as not authenticated.

If the communication device 20 is authenticated (YES at Step S241), the routing unit 13 obtains the transmission source IP address and the destination IP address from the packet including the communication data (Step S242). Next, the routing unit 13 determines whether the transmission source IP address and the destination IP address are IP addresses in the same white net (Step S243). Namely, it is determined whether the subnet address of the transmission source IP address is equivalent to the subnet address of the destination IP address.

The respective subnet addresses of the transmission source IP address and the destination IP address can be identified based on, for example, the device certificates stored in the certificate list storage unit 15 that are associated with the respective IP addresses (FIG. 15). Namely, the respective subnet addresses can be identified based on the respective IP addresses and the corresponding respective device certificates that include global routing prefix masks, subnet ID masks, and private ID masks.

If the subnet address of the transmission source IP address is equivalent to the subnet address of the destination IP address (YES at Step S243), the process goes forward to Step S246.

If the subnet address of the transmission source IP address is not equivalent to the subnet address of the destination IP address (NO at Step S243), the routing unit 13 refers to the routing policy stored in the routing policy storage unit 17 (Step S244). Note that a case where the device certificate corresponding to the destination IP address is not stored in the certificate list storage unit 15 is considered to correspond to a case where the subnet address of the transmission source IP address is not equivalent to the subnet address of the destination IP address. In this case, the communication device 20 relating to the destination IP address does not belong to either of the white nets.

FIG. 25 is a schematic view illustrating an example of a configuration of the routing policy storage unit 17. In FIG. 25, the routing policy storage unit 17 includes, as items, a global routing prefix, a global routing prefix mask, a transmission source white net ID, a subnet mask, a permission list, and a denial list.

With the global routing prefix and the transmission source white net ID, the subnet address of the white net of the transmission source is identified. Also, with the global routing prefix and the permission list, the subnet address of a white net is identified to which data transmission is permitted from the white net of the transmission source. Further, with the global routing prefix and the denial list, the subnet address of a white net is identified to which data transmission is not permitted from the white net of the transmission source.

Therefore, at Step S244, the routing unit first identifies a record having a combination of the global routing prefix and the transmission source white net ID that is equivalent to the subnet address of the transmission source IP address. The routing unit 13 determines that routing is permitted if a combination of the global routing prefix and one of the items included in the permission list in the record is equivalent to the subnet address of the destination IP address. On the other hand, the routing unit 13 determines that routing is not permitted if a combination of the global routing prefix and one of the items included in the denial list in the record is equivalent to the subnet address of the destination IP address.

Note that the routing policy storage unit 17 may store only one of the permission list and the denial list.

If it is determined that routing is permitted (YES at Step S245), the process goes forward to Step S246. At Step S246, the routing unit 13 decrypts the communication data with the symmetric key for encryption that is stored and associated with the transmission source IP address of the packet including the communication data (Step S246). Next, the routing unit 13 encrypts the communication data with the symmetric key for encryption stored and associated with the destination IP address of the packet including the communication data (Step S247). Next, the routing unit 13 routes the packet including the encrypted communication data to the destination IP address (Step S248). Routing uses, for example, routing information stored in the routing information storage unit 18.

FIG. 26 is a schematic view illustrating an example of a configuration of the routing information storage unit 18. In FIG. 26, the routing information storage unit 18 includes, as items, a global routing prefix, a global routing prefix mask, a subnet mask, a white net ID, and a port number. Namely, the routing information storage unit 18 stores a port number that is associated with a subnet address that is identified with a combination of a global routing prefix mask and a white net ID.

Therefore, the routing unit 13 searches for a combination of a global routing prefix mask and a white net ID that is equivalent to the subnet address of the destination IP address in the routing information storage unit 18. The routing unit 13 outputs a packet including the communication data to the port relating to the port number that is associated with the search-found combination.

Note that the subnet address of the destination IP address can be identified, for example, based on the device certificate including the destination IP address.

As described above, according to the present embodiment of the present invention, a white net is formed that is a virtual subnet with which only communication devices 20 that have been authenticated based on their respective device certificates can connect. A communication device 20 connected with the white net has identification that is guaranteed based on the device certificate and the like. Therefore, a communication environment can be provided where safety is improved with the white net.

Also, the subnet address of each white net includes the subnet ID and a part of the interface ID. Therefore, it is possible to configure a number of white nets that is over the restriction of the subnet ID length. Also, if an environment is implemented where the subnet ID length is variable to be compliant with RFC 3513, the subnet address can be hidden from the outside by using a part of the interface ID for the subnet address. Namely, even if the subnet ID is variable, it is considered that demand is high for disclosing the range of the subnet ID for network devices such as a router. Therefore, if white nets are identified with only the subnet ID, the subnet address of each of the white nets can be easily identified by analyzing content of packets. On the other hand, demand is low for disclosing the private ID length, which is a part of the interface ID, for network devices such as a router. Therefore, by providing the private ID separately from the subnet ID, it is difficult to identify which part of an IP address is the subnet address of a white net. Consequently, illegal access to the white net can be made highly difficult.

Also, according to the present embodiment, the likelihood can be raised in that an issuance of a device certificate is restricted for a valid or genuine communication device 20. Namely, at Step S17 in FIG. 11, information specified for an issuance request of a device certificate that is transmitted by the certificate issuance request unit 22 is collected in a process that the certificate obtainment program in the security chip 206 has the security chip 206 execute. In general, falsification of information is performed by a program. For example, it is difficult to alter a MAC address stored in the interface unit 205; hence falsification of the MAC address is performed by a program that reads the MAC address. According to the present embodiment, the certificate obtainment program is verified by the security chip 206 at Step S1 that it has not been falsified. Also, tamper resistance of the security chip 206 makes it difficult to rewrite the certificate obtainment program stored in the security chip 206 and its hash value. Therefore, it is unlikely that information such as a MAC address and report information is falsified while the information is collected by the security chip 206, and then transmitted to the certificate issuance apparatus 30. In other words, it is difficult for a communication device 20 to falsify its own MAC address, configuration information, and the like.

Also, report information specified in an issuance request of a device certificate is obtained beforehand via a reliable route, and is compared with a right answer or a model answer of the report information stored in the white list storage unit 36. With this comparison, it is possible to detect, for example, an invalid installation of a program in a communication device 20, falsification of an OS installed beforehand, and further, an invalid installation of hardware. If such an illegal act is detected, the issuance of a device certificate is not executed that is required for connecting with a white net. Therefore, it raises the likelihood of a communication device 20 having an illicitly falsified device configuration being prevented from connecting with a white net.

Note that the length of the private ID mask may be 0 according to the present embodiment. In this case, a white net or a subnet Ns is identified by the subnet ID.

Note that the security chip 206 is an example of an information processing apparatus having tamper resistance according to the present embodiment. An IP address is an example of a communication address. The certificate issuance apparatus 30 is an example of a certificate generation apparatus. The issuance request reception unit 31 is an example of a reception unit. The white list storage unit 36 is an example of a storage unit of a certificate generation apparatus. The address determination unit 33 is an example of a determination unit. The certificate generation unit 34 is an example of a generation unit. The response transmission unit 35 is an example of a transmission unit of a certificate generation apparatus.

The report generation unit 21 is an example of a collection unit. The certificate issuance request unit 22 is an example of a transmission unit of an information processing apparatus. The certificate reception unit 23 is an example of a reception unit. The device certificate storage unit 26 is an example of a storage unit of an information processing apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A certificate generation method executed by a computer, the certificate generation method comprising:
    verifying, when a certificate issuance request including an electronic signature is received from a communication device, the electronic signature by comparing a first value corresponding to the certificate issuance request with a second value obtained by decoding the electronic signature;
    receiving a specific information item and a configuration information item of the communication device from the communication device, the specific information item and the configuration information item being collected by a tamper-resistant information processing apparatus provided in the communication device;
    obtaining a communication address of the communication device from a first storage unit of the computer, the first storage unit storing communication addresses associated with specific information items beforehand, based on the received specific information item, when a combination of the received specific information item and the received configuration information item of the communication device is equivalent to a combination of a specific information item and a configuration information item of the communication device stored beforehand in a second storage unit of the computer;
    generating an electronic certificate including a part or all of the received specific information item and the received configuration information item, and the obtained communication address; and
    transmitting the electronic certificate to the communication device,
    wherein the electronic certificate transmitted to the communication device includes the communication address which is not received from the communication device.

2. The certificate generation method according to claim 1, wherein the obtaining includes obtaining the communication address when the electronic signature is valid.

3. The certificate generation method according to claim 1, wherein the received specific information item of the communication device is one of a MAC address of the communication device and an electronic certificate of the communication device.

4. The certificate generation method according to claim 1, wherein the received configuration information item of the communication device is one of an ID of hardware included in or connected to the communication device, a version of software installed in the communication device, and a hash value of the software installed in the communication device.

5. The certificate generation method according to claim 1, wherein a public key stored in the computer is used when verifying the electronic signature, and the public key corresponds to a private key of the information processing apparatus.

6. A certificate generation apparatus comprising:
a memory; and
a processor coupled to the memory, wherein the processor executes a process including:
verifying, when a certificate issuance request including an electronic signature is received from a communication device, the electronic signature by comparing a first value corresponding to the certificate issuance request with a second value obtained by decoding the electronic signature;
receiving a specific information item and a configuration information item of the communication device from the communication device, the specific information item and the configuration information item being collected by a tamper-resistant information processing apparatus provided in the communication device;
obtaining a communication address of the communication device from a first storage unit of the memory, the first storage unit storing communication addresses associated with specific information items beforehand, based on the received specific information item, when a combination of the received specific information item and the received configuration information item of the communication device is equivalent to a combination of a specific information item and a configuration information item of the communication device stored beforehand in a second storage unit of the memory;
generating an electronic certificate including a part or all of the received specific information item and the received configuration information item, and the obtained communication address; and
transmitting the electronic certificate to the communication device,
wherein the electronic certificate transmitted to the communication device includes the communication address which is not received from the communication device.

7. The certificate generation apparatus according to claim 6, wherein the received specific information item of the communication device is one of a MAC address of the communication device and an electronic certificate of the communication device.

8. The certificate generation apparatus according to claim 6, wherein the received configuration information item of the communication device is one of an ID of hardware included in or connected to the communication device, a version of software installed in the communication device, and a hash value of the software installed in the communication device.

9. The certificate generation apparatus according to claim 6, wherein a public key stored in the memory is used when verifying the electronic signature, and the public key corresponds to a private key of the information processing apparatus.

* * * * *